(12) United States Patent
Kawamae et al.

(10) Patent No.: US 12,327,319 B2
(45) Date of Patent: Jun. 10, 2025

(54) VIRTUAL REALITY SHARING METHOD AND SYSTEM

(71) Applicant: MAXELL, LTD., Kyoto (JP)

(72) Inventors: Osamu Kawamae, Kyoto (JP); Masuo Oku, Kyoto (JP)

(73) Assignee: MAXELL, LTD., Kyoto (JP)

( * ) Notice: Subject to any disclaimer, the term of this patent is extended or adjusted under 35 U.S.C. 154(b) by 164 days.

(21) Appl. No.: 18/019,898

(22) PCT Filed: Aug. 6, 2020

(86) PCT No.: PCT/JP2020/030202
§ 371 (c)(1),
(2) Date: Feb. 6, 2023

(87) PCT Pub. No.: WO2022/029959
PCT Pub. Date: Feb. 10, 2022

(65) Prior Publication Data
US 2023/0290081 A1 Sep. 14, 2023

(51) Int. Cl.
*G06T 19/00* (2011.01)
*G06F 3/01* (2006.01)
(Continued)

(52) U.S. Cl.
CPC ............ *G06T 19/006* (2013.01); *G06F 3/012* (2013.01); *G06T 7/70* (2017.01); *G06T 15/10* (2013.01);
(Continued)

(58) Field of Classification Search
CPC ............. H04N 7/157; H04N 21/41407; H04N 21/4788; H04N 21/816; H04N 21/4223;
(Continued)

(56) References Cited

U.S. PATENT DOCUMENTS 11,513,658 B1 * 11/2022 Olsen .................... H04L 65/612
2006/0227151 A1 10/2006 Bannai et al.
(Continued)

FOREIGN PATENT DOCUMENTS

JP 2006-293604 A 10/2006
JP 2016-167688 A 5/2016
(Continued)

OTHER PUBLICATIONS

Extended European Search Report received in corresponding European Application No. 20948339.5 dated Dec. 18, 2023.
(Continued)

*Primary Examiner* — Xilin Guo
(74) *Attorney, Agent, or Firm* — Mattingly & Malur, PC

(57) ABSTRACT

A virtual reality sharing system comprises a VR-server that composites a plurality of camera-captured videos obtained by capturing videos of a same real space from different viewpoints to create a VR video, an AR-server that draws and creates an AR object (ARO), and a viewer virtual reality sharing terminal (terminal), wherein the VR server, the AR-server, and the terminal being communicatively connected via a network, wherein an input interface of the terminal accepts a setting input operation about a viewer's viewpoint for taking in the VR video, the terminal transmits data indicating a position and direction of the viewer's viewpoint to the VR-server and the AR-server, receives the VR video and drawing data of the ARO viewed as seen from the viewer's viewpoint from each of the VR-server and the AR-server, superimposes the ARO on the received VR video, and displays the superimposed VR video on the display of the terminal.

8 Claims, 22 Drawing Sheets

(51) Int. Cl.
*G06T 7/70* (2017.01)
*G06T 15/10* (2011.01)

(52) U.S. Cl.
CPC ............... *G06T 2207/10016* (2013.01); *G06T 2219/024* (2013.01)

(58) Field of Classification Search
CPC ............... H04N 13/117; H04N 19/597; H04N 21/21805; G06F 3/011; G06F 3/012; G06F 3/013; G06T 19/006; G06T 15/10; G06T 7/70; G06T 2219/024; G06T 2207/10016; G06T 2207/30244
See application file for complete search history.

(56) References Cited

U.S. PATENT DOCUMENTS

| | | |
|---|---|---|
| 2012/0249416 A1 | 10/2012 | Maciocci et al. |
| 2016/0054793 A1 | 2/2016 | Kasahara et al. |
| 2016/0269631 A1 | 9/2016 | Jiang et al. |
| 2016/0357491 A1 | 12/2016 | Oya et al. |
| 2017/0076499 A1* | 3/2017 | Jiang .................. G06T 7/00 |
| 2017/0365102 A1 | 12/2017 | Huston et al. |
| 2020/0051336 A1* | 2/2020 | Ichikawa ............ G06T 19/006 |
| 2020/0169718 A1* | 5/2020 | Begeja ................ G06V 20/48 |
| 2020/0265646 A1* | 8/2020 | Schou ................. G06V 20/20 |
| 2021/0209856 A1* | 7/2021 | Liukkonen ....... H04N 21/41407 |

FOREIGN PATENT DOCUMENTS

| | | |
|---|---|---|
| JP | 2016-224810 A | 12/2016 |
| WO | 2014162852 A1 | 10/2014 |
| WO | 2018/175335 A1 | 9/2018 |

OTHER PUBLICATIONS

International Search Report of PCT/JP2020/030202 dated Nov. 2, 2020.

* cited by examiner

VIRTUAL REALITY SHARING METHOD AND SYSTEM

TECHNICAL FIELD

The present invention relates to a virtual reality sharing method and system, and relates to a method and system for sharing a Mixed Reality (MR) space formed with a real space and a virtual space (AR object, also referred to as an Augmented Reality object) among a plurality of persons.

BACKGROUND ART

Patent Literature 1 discloses a technique "including a first image acquiring step of acquiring a first three-dimensional image based on a three-dimensional video by a first three-dimensional imaging portion worn by a first user and a virtual object image based on the position attitude of the first three-dimensional imaging portion, a second image acquiring step of acquiring a second three-dimensional image based on a three-dimensional video by a second three-dimensional imaging portion installed in a space where the first user is present and a virtual object image based on the position attitude of the second three-dimensional imaging portion, a selection step of selecting an image corresponding to an instruction of a second user from among the first three-dimensional image and second three-dimensional image, and a presentation step of presenting the selected image to the second user (excerpted from Abstract)".

CITATION LIST

Patent Literature

Patent Literature 1: JP-A-2006-293604

SUMMARY OF INVENTION

Technical Problem

According to Patent Literature 1, for sharing an MR space with a viewer at a remote site, a fixed camera arranged in a real space is used in addition to an HMD for an experiencer (operator). This enables selection, as a line of sight of a viewer, from either the line of sight of the HMD for the experiencer or that of the fixed camera, and thus sharing of the MR space can be realized based on the selected line of sight.

However, in Patent Literature 1, the viewer at the remote site is only allowed to share the MR space with a fixed line of sight of either the HMD for the experiencer or the fixed camera. This causes a problem that the viewer is only allowed to share the MR space with a limited line of sight.

The present invention has been made in view of the problem above, and an object of the present invention is to increase flexibility in selecting a line of sight for sharing an MR space by a viewer.

Solution to Problem

In order to solve the problem above, the present invention includes the features recited in the scope of claims. One of the aspects thereof is a virtual reality sharing method, comprising the steps of: acquiring a first camera-captured video generated by capturing a video of a real space at a first viewpoint of a first virtual reality sharing terminal; as a first displaying step, causing the first virtual reality sharing terminal to display an AR object to be superimposed on the real space; acquiring a second camera-captured video generated by capturing a video of the real space at a second viewpoint different from the first viewpoint; as a VR video creating step, generating a VR video by compositing the first camera-captured video and the second camera-captured video;

as a viewpoint acquiring step, acquiring setting input information about a viewer's viewpoint for taking in the VR video, the setting input information having been accepted at a second virtual reality sharing terminal different from the first virtual reality shared terminal; and as a second displaying step, superimposing the AR object viewed from the viewer's viewpoint on the VR video viewed from the viewer's viewpoint and causing the second virtual reality sharing terminal to display the VR video.

Advantageous Effects of Invention

According to the present invention, it is possible to increase flexibility in selecting a line of sight for sharing an MR space by a viewer. The objects, configurations, and advantageous effects other than those described above will be clarified in the embodiments to be described below.

DESCRIPTION OF EMBODIMENTS

Hereinafter, embodiments of the present invention will be described with reference to the drawings. Throughout all the drawings, the common elements and steps are provided with the same reference signs, and are not described in detailed repetitively.

In the field of games, telemedicine, and maintenance, a technique of adding an AR object created by use of computer graphics (CG) to a background image of a real space captured by a camera is used. In order to add an AR object, a video capturing a real object which is called an AR trigger or marker is obtained together with a video capturing a background, and an AR object associated with the AR trigger or marker is composited with the background video.

In particular, in Mixed Reality (MR), using a head-mounted display (HMD) integrally provided with a camera and a display allows an AR object to be drawn in accordance with the position and orientation of the HMD to be superimposed on a background video taken by a camera equipped in the HMD or a background video viewed through the HMD and displayed, as a video of a virtual space, on the HMD.

The present embodiment can provide simulated experience through a video and enables sharing of the simulated experience among a plurality of persons, by means of a video of a virtual space, particularly, using Virtual Reality (VR) allowing images of a space in an ultra-wide area (for example, 360°) to be continuously displayed in accordance with a motion of a person who is wearing an HMD.

First Embodiment (System Configuration and HMD)

Figure 1:
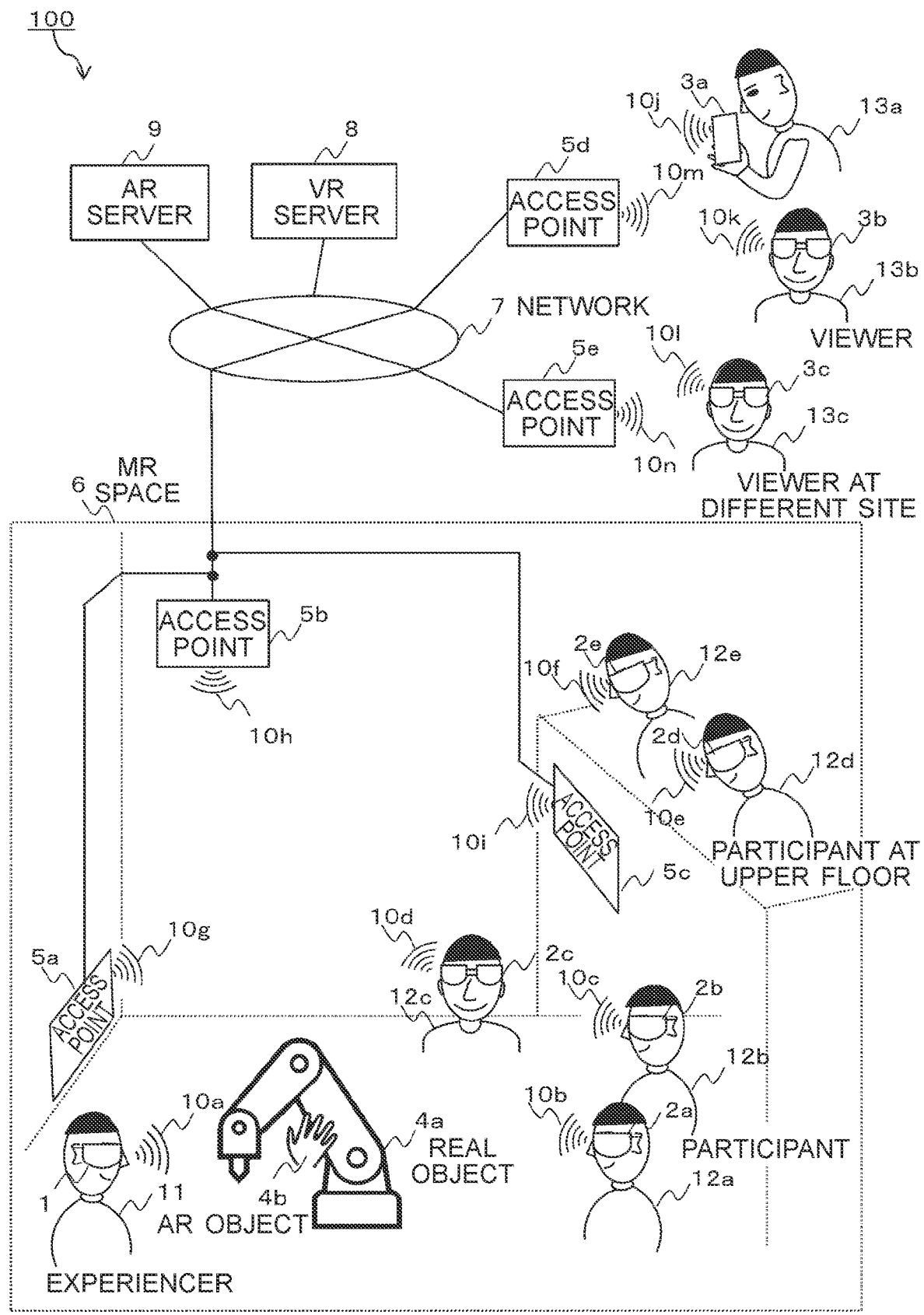
FIG. 1 is a schematic diagram of a virtual reality sharing system according to a first embodiment.

FIG. 1 is a schematic diagram of a virtual reality sharing system 100 according to a first embodiment.

The virtual reality sharing system 100 is a system that allows sharing of a virtual space including an MR space 6 among an experiencer 11 having the right to operate an AR object 4b, participants 12a, 12b, 12c, 12d, 12e who are present in the same real space as that of the experiencer 11 and visually recognize the AR object 4b, and viewers 13a, 13b, 13c who are present in a real space (remote site) different from that of the experiencer 11 and participants 12a to 12e. Advantageously, the virtual reality sharing system 100 enables not only the experiencer 11 and participants 12a to 12e who are present in the same real space, but also the viewers 13a to 13c who are in a remote site to share and experience the virtual reality including the MR space 6.

In the MR space 6, the AR object 4b associated with a real object 4a as an AR marker is superimposed and displayed on the real object 4a. In FIG. 1, the real object 4a is an instrument to be operated which is a new product, and the AR object 4b is an operation means. FIG. 1 illustrates an example in which the experiencer 11 is demonstrating how to operate the new product with the AR object 4b.

An experiencer HMD 1 (hereinafter, may be abbreviated as "HMD 1") worn by the experiencer 11 and participant HMDs 2a to 2e (hereinafter, may be abbreviated as "HMDs 2a to 2e") worn by the participants 12a to 12e, respectively, transmit and receive network signals 10a, 10b, 10c, 10d, 10e, 10f, 10g, 10h, 10i to and from access points 5a to 5c installed in the MR space 6. The experiencer HMD 1 and the participant HMDs 2a to 2e are virtual reality sharing terminals.

Viewer information terminal 3a (hereinafter, may be abbreviated as "information terminal 3a") operated by the viewer 13a and viewer HMDs 3b, 3c (hereinafter, may be abbreviated as "HMDs 3b, 3c") worn by the viewers 13b, 13c, respectively, transmit and receive network signals 10j, 10k, 10l, 10m, 10n to and from access points 5d, 5e. The viewer information terminal 3a and the viewer HMDs 3b, 3c are also virtual reality sharing terminals.

The access points 5a to 5c are connected to a network 7 outside the MR space 6, and serve as intermediary media for communication among a VR server 8 and AR server 9 located on the network 7, and the HMD 1 and HMDs 2a to 2e. On the network 7, access points 5d, 5e for a remote site are also located, and serve as intermediary media for communication among the VR server 8, the AR server 9, the viewer HMDs 3b, 3c, and the information terminal 3a.

Displaying a three-dimensional image of the AR object 4b on the HMD 1, HMDs 2a to 2e, and HMDs 3b, 3c can realize display with reality in which the front and rear positional relation between the real object 4a and the AR object 4b is reflected.

Figure 2A:
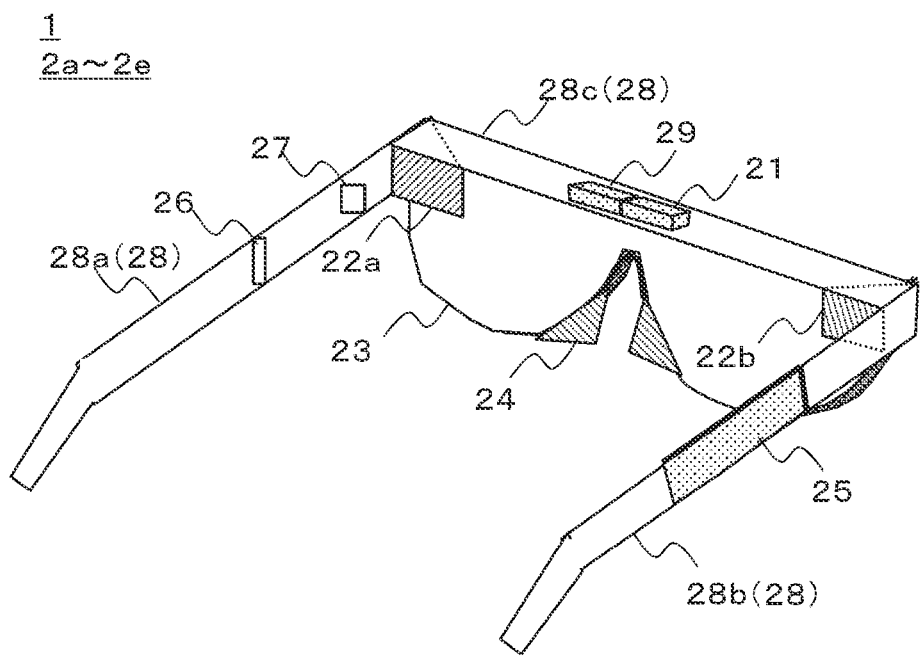
FIG. 2A illustrates appearance of an experiencer HMD and participant HMD which are virtual reality sharing systems.
Figure 2B:
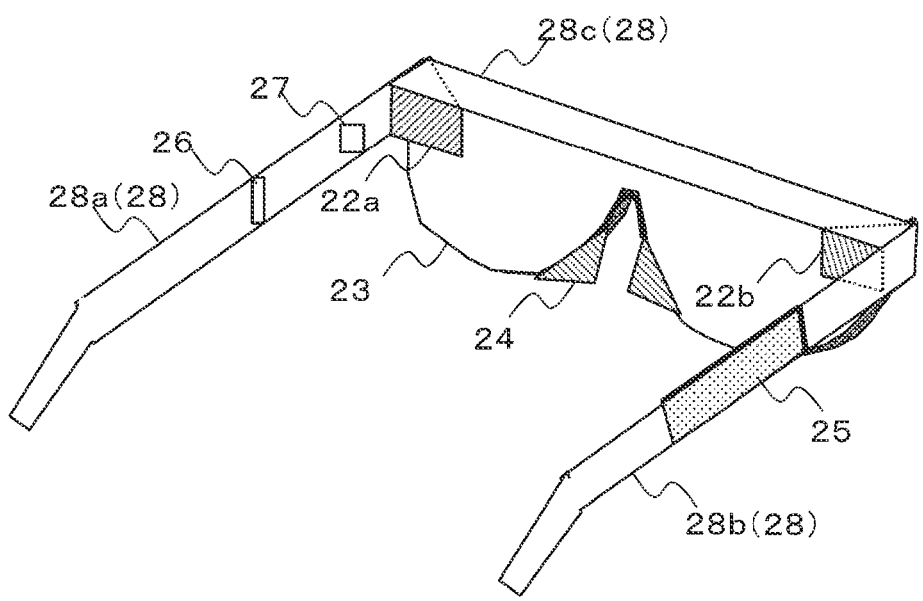
FIG. 2B illustrates appearance of a viewer HMD which is a virtual reality sharing system.

FIG. 2A illustrates appearance of the experiencer HMD 1 and participant HMDs 2a to 2e which are the virtual reality sharing terminals, and FIG. 2B illustrates appearance of the viewer HMDs 3b, 3c which are the virtual reality sharing terminals.

First, a configuration common to the experiencer HMD 1, participant HMDs 2a to 2e, and the viewer HMDs 3b, 3c will be described. Each of the experiencer HMD 1, the participant HMDs 2a to 2e, and the viewer HMDs 3b, 3c includes a left projector 22a, a right projector 22b, a screen 23, a nose pad 24, a processor 25, a speaker 26, a microphone 27, a left temple 28a, a right temple 28b, and a bridge 28c. The left temple 28a, the right temple 28b, and the bridge 28c may be collectively called a frame housing 28. The wearer puts the HMD on his or her face via the frame housing 28 and the nose pad 24.

Each of the experiencer HMD 1 and participant HMDs 2a to 2e further includes a camera 21 and a ranging camera 29. The camera 21 is mounted so as to take a video of the background that is a real space in front of a line of sight of the wearer of the HMD. The ranging camera 29 measures a distance to the real object 4a to be captured as a portion of the background video.

The wearer of each of the experiencer HMD 1 and participant HMDs 2a to 2e transparently views the background video of the real space in front thereof through a screen 23, or views the background video taken by the mounted camera 21 and projected on the screen 23. The left projector 22a and the right projector 22b project the AR object 4b on the screen 23 as a video to be viewed by the left eye and a video to be viewed by the right eye so that the AR object 4b is three-dimensionally displayed as if the AR object 4b is present at a predetermined distance in the real space. In the viewer HMDs 3b, 3c, a VR video, which will be described later, and the AR object 4b are superimposed and then displayed.

For displaying a video of an MR space on the HMDs, the occlusion techniques are applied to process the drawing data of the AR object, so that the video of the MR space can be displayed with more reality. Using the occlusion techniques enables, based on the front and rear distance relation between the real object 4a and the AR object 4b, such displaying that, when a portion of the real object 4a is in front of a portion of the AR object 4b, the portion of the AR object 4b is hidden in the portion of the real object 4a.

The processor 25, the camera 21, the speaker 26, and the microphone 27 are arranged in the frame housing 28. Note that the arrangement thereof does not have to be the same as that illustrated in FIG. 2A and FIG. 2B.

(Block Diagram of 3D Virtual Reality Display Apparatus)

Figure 3:
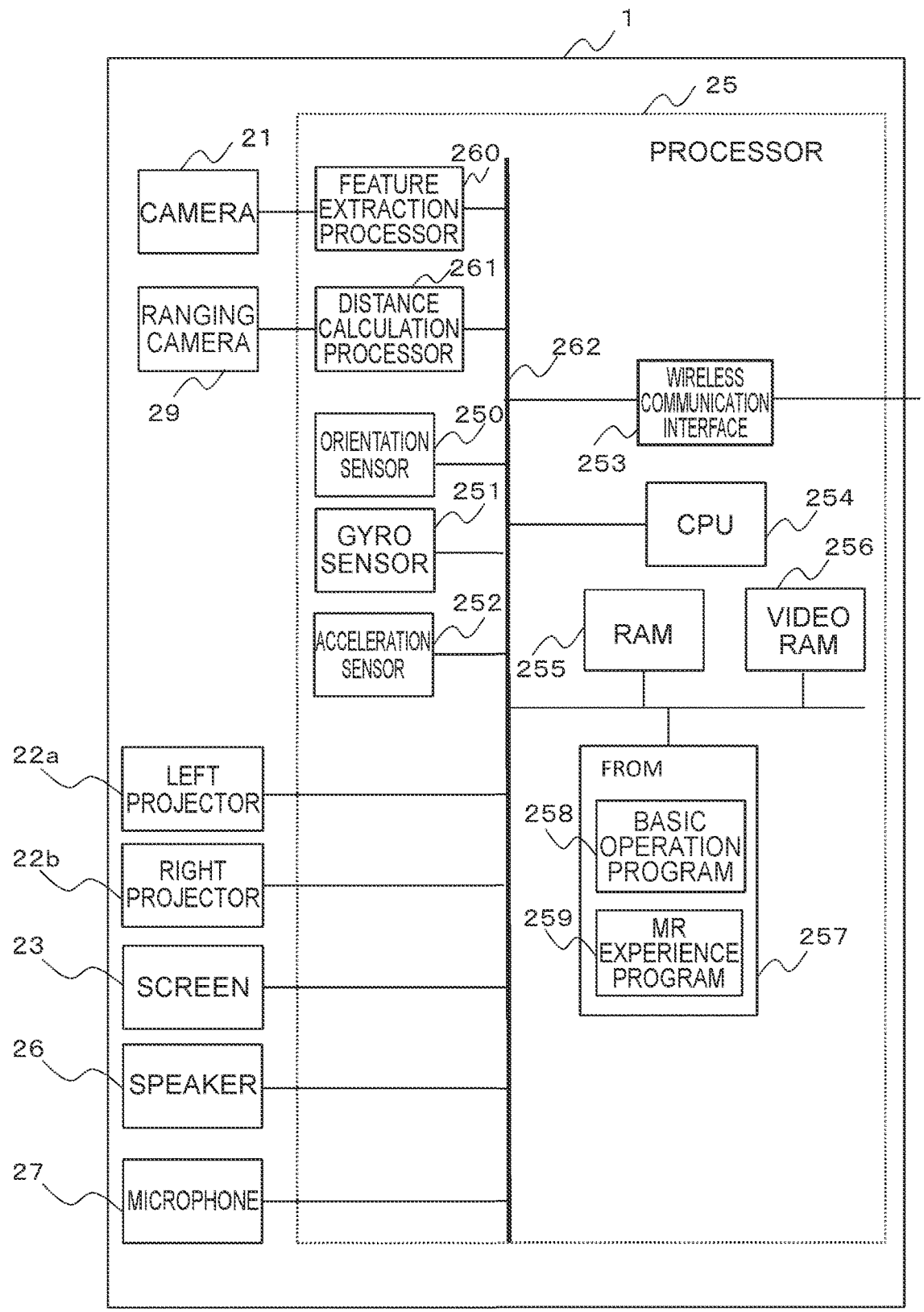
FIG. 3 is a block diagram of the experiencer HMD.

FIG. 3 is a block diagram of the experiencer HMD 1. In FIG. 3, the processor 25 is surrounded by a broken line, and is connected to the camera 21, the ranging camera 29, the left projector 22a, the right projector 22b, the screen 23, the speaker 26, the microphone 27, an orientation sensor 250, a gyro sensor 251, and an acceleration sensor 252.

The processor 25 includes a CPU 254, a RAM 255, a video RAM 256, a FROM 257, a feature extraction processor 260, a distance calculation processor 261, the orientation sensor 250, the gyro sensor 251, the acceleration sensor 252, and an internal bus 262. The elements above are connected to each other via the internal bus 262. In some cases, the processor 25 may be configured without the orientation sensor 250, the gyro sensor 251, and the acceleration sensor 252.

The left projector 22a and the right projector 22b project an image for the left eye and an image for the right eye onto the screen 23, respectively and independently, so as to realize 3D-display of a video. Alternatively, they may be other display apparatuses capable of realizing 3D-display such as an optical system using holographic lenses.

A wireless communication interface 253 selects appropriate processing from among several types of communication processing of, for example, mobile communication such as 4G and 5G, wireless LAN, and the like and connects the HMD 1 to the network 7 via any of the access points 5a, 5b, 5c.

The FROM 257 includes, as processing programs, a basic program 258 and an MR experience program 259. The CPU 254 loads these processing programs and executes them on the RAM 255. In addition, the FROM 257 retains data necessary for executing the processing programs. The FROM 257 may be a single memory medium as illustrated in FIG. 3, or configured with a plurality of memory media, and moreover, the FROM 257 may be a non-volatile memory medium other than a Flash ROM.

The CPU 254 stores video data to be transmitted to the left projector 22a and the right projector 22b in the video RAM 256. The CPU 254 reads the video data from the video RAM 256, whereby the video data is projected from the left projector 22a and the right projector 22b onto the screen 23.

The feature extraction processor 260 extracts an outline (edge) of a real object from a background video taken by the camera 21, and performs the processing to set an inflection point and a vertex in the outline as feature points. The distance data obtained by the distance calculation processor 261 is combined with these feature points. A set of feature point data forming the outline is associated with the background video.

The orientation sensor 250, the gyro sensor 251, and the acceleration sensor 252 are used to trace, for example, the position of the HMD 1 and the capturing direction of the camera (equivalent to the line of sight of the experiencer 11). Using the positions obtained by using the access points 5a, 5b, 5c whose arrangement positions have been already known, which will be described later, and the line-of-sight directions in the vertical and lateral directions obtained by the orientation sensor 250 and the acceleration sensor 252 and also tracing the motion of the HMD 1 by the gyro sensor 251 or the like enables detection of change in the position and direction caused by the motion of the wearer (experiencer 11) of the HMD 1.

Figure 4:
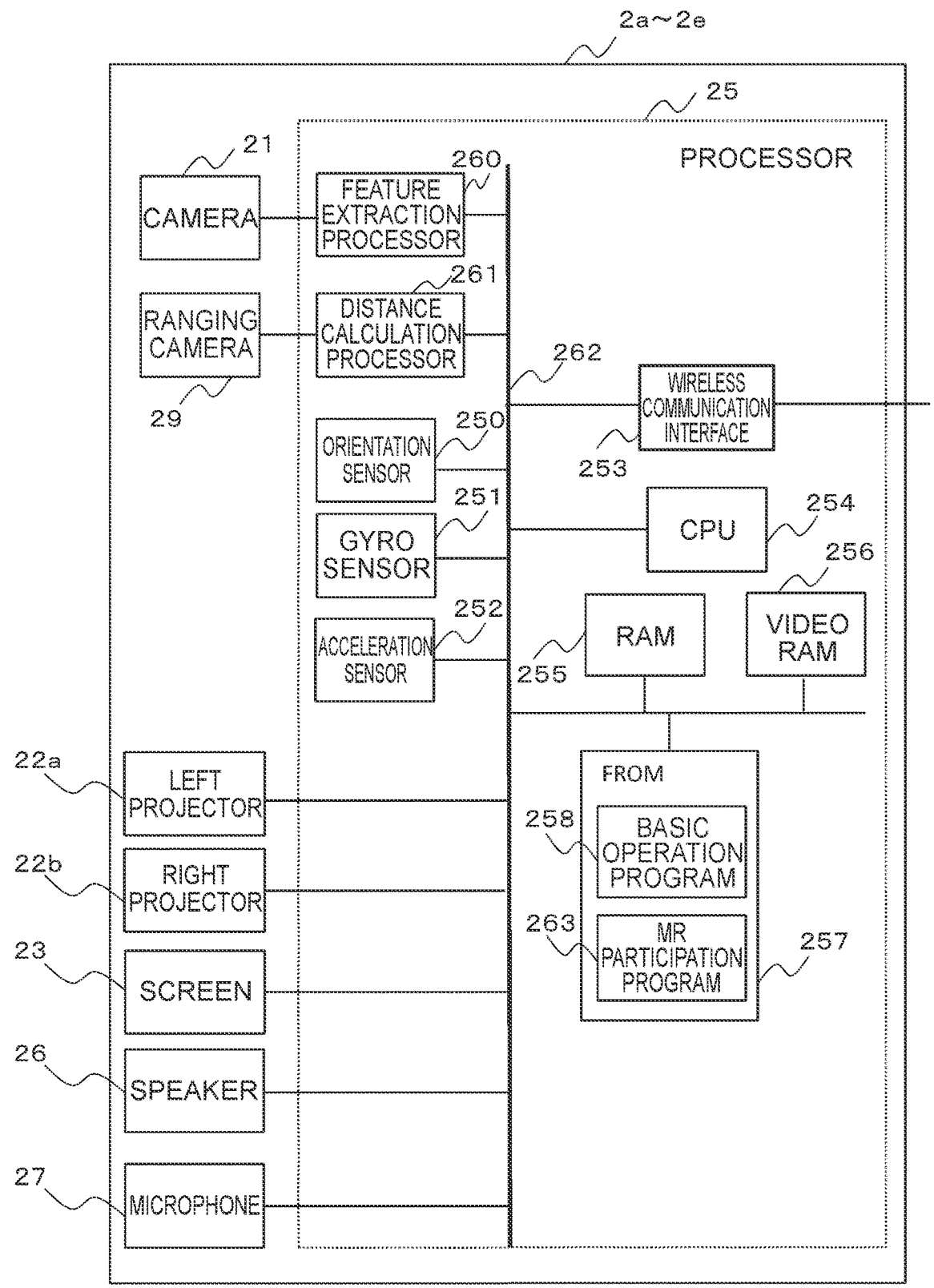
FIG. 4 is a block diagram of the participant HMD.

FIG. 4 is a block diagram of the participant HMDs 2a to 2e. In FIG. 4, the FROM 257 retains the basic program 258 and an MR participation program 263. The HMDs 2a to 2e have the same hardware configuration as that of the HMD 1, but differs from the HMD 1 in that the MR participation program 263 which is an application program is stored in place of the MR experience program 259 of the HMD 1.

Figure 5:
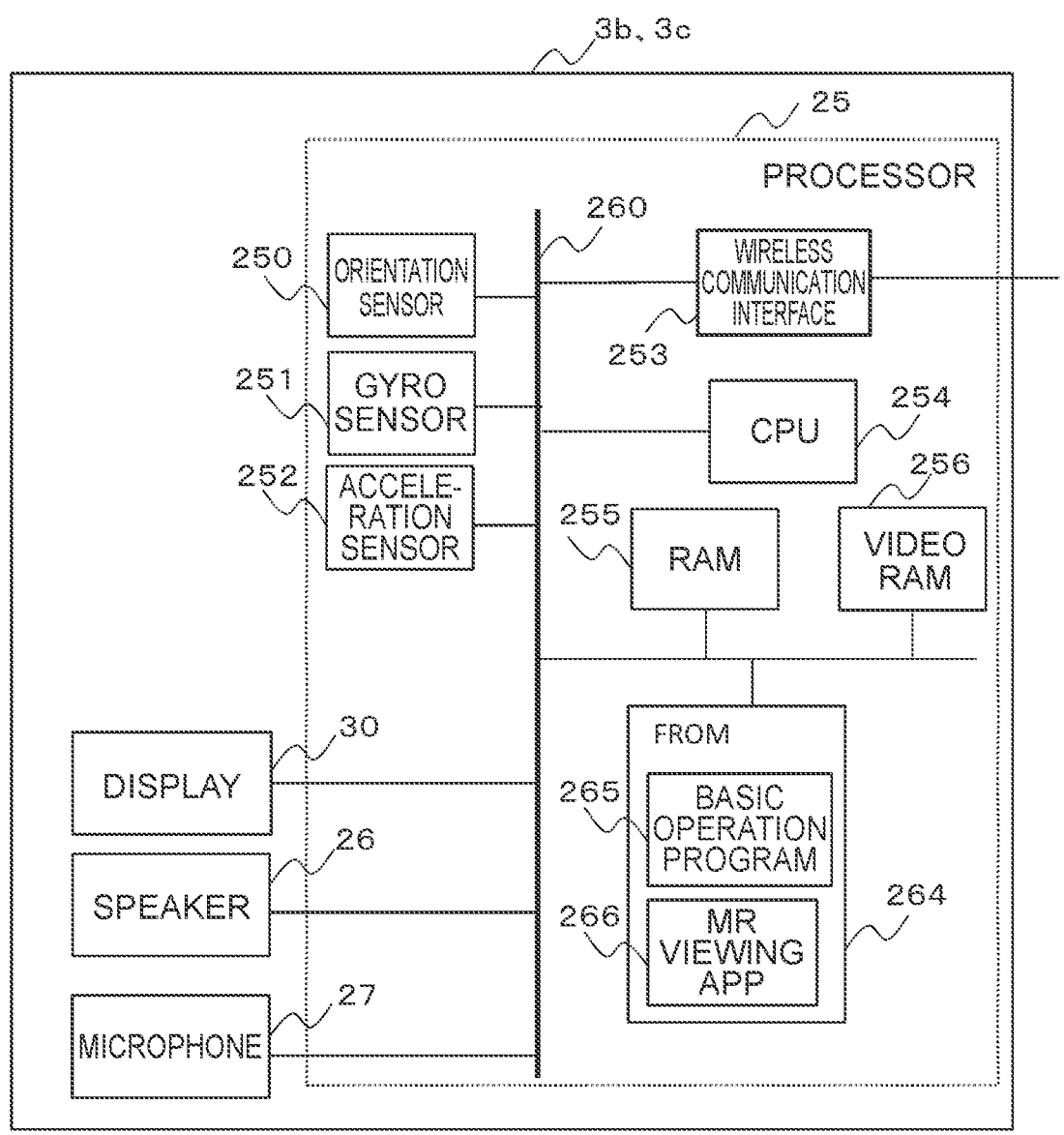
FIG. 5 is a block diagram of the viewer HMD.

FIG. 5 is a block diagram of the viewer HMDs 3b, 3c. In FIG. 5, the camera 21 and the ranging camera 29 are omitted, and the FROM 264 retains a basic program 265 and an MR viewing program 266. Furthermore, the viewer HMDs 3b, 3c include, instead of the left projector 22a, the right projector 22b, and the screen 23, an immersive (non-transparent, shielding) display 30.

Figure 6:
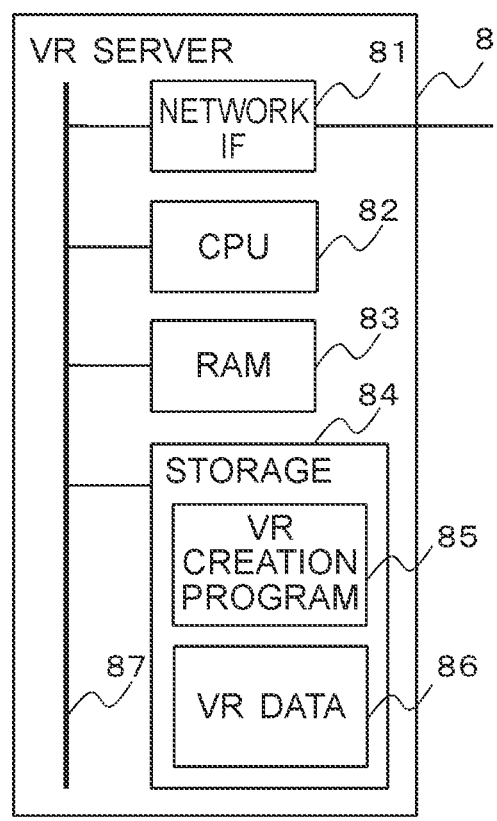
FIG. 6 is a block diagram of a VR server.

FIG. 6 is a block diagram of the VR server 8. In FIG. 6, the VR server 8 includes a network interface (network IF) 81 for a wired LAN and the like, a CPU 82, a RAM 83, a storage 84, and an internal bus 87. The elements above are connected to each other via the internal bus 87.

The storage 84 may be configured with, other than the Flash ROM, a hard disk drive or the like. The storage 84 includes a VR creation program 85 as a processing program, and the CPU 82 loads the VR creation program 85 and executes it on the RAM 83. The storage 84 further includes VR data 86, and retains data necessary for executing the processing program.

Figure 7:
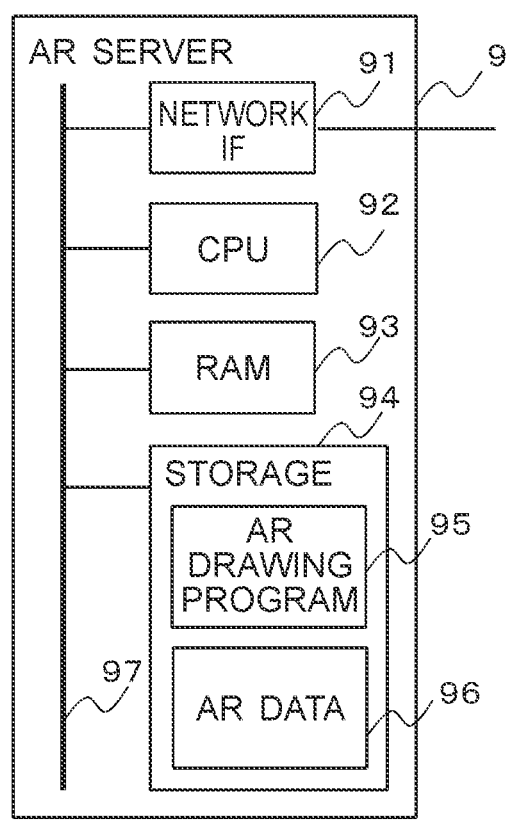
FIG. 7 is a block diagram of an AR server.

FIG. 7 is a block diagram of the AR server 9. In FIG. 7, the AR server 9 includes a network IF 91 for a wired LAN and the like, a CPU 92, a RAM 93, a storage 94, and an internal bus 97. The elements above are connected to each other via the internal bus 97.

The storage 94 may be configured with, other than the Flash ROM, a hard disk drive or the like. The storage 94 includes an AR drawing program 95 as a processing program, and the CPU 92 loads the AR drawing program 95 and executes it on the RAM 93. The storage 94 further includes AR data 96, and retains data necessary for executing the processing program. The storage 94 may archive a previously created AR object as the AR data 96, and urge the experiencer to use it during execution of the processing program.

(Generation of VR Video)

Figure 8:
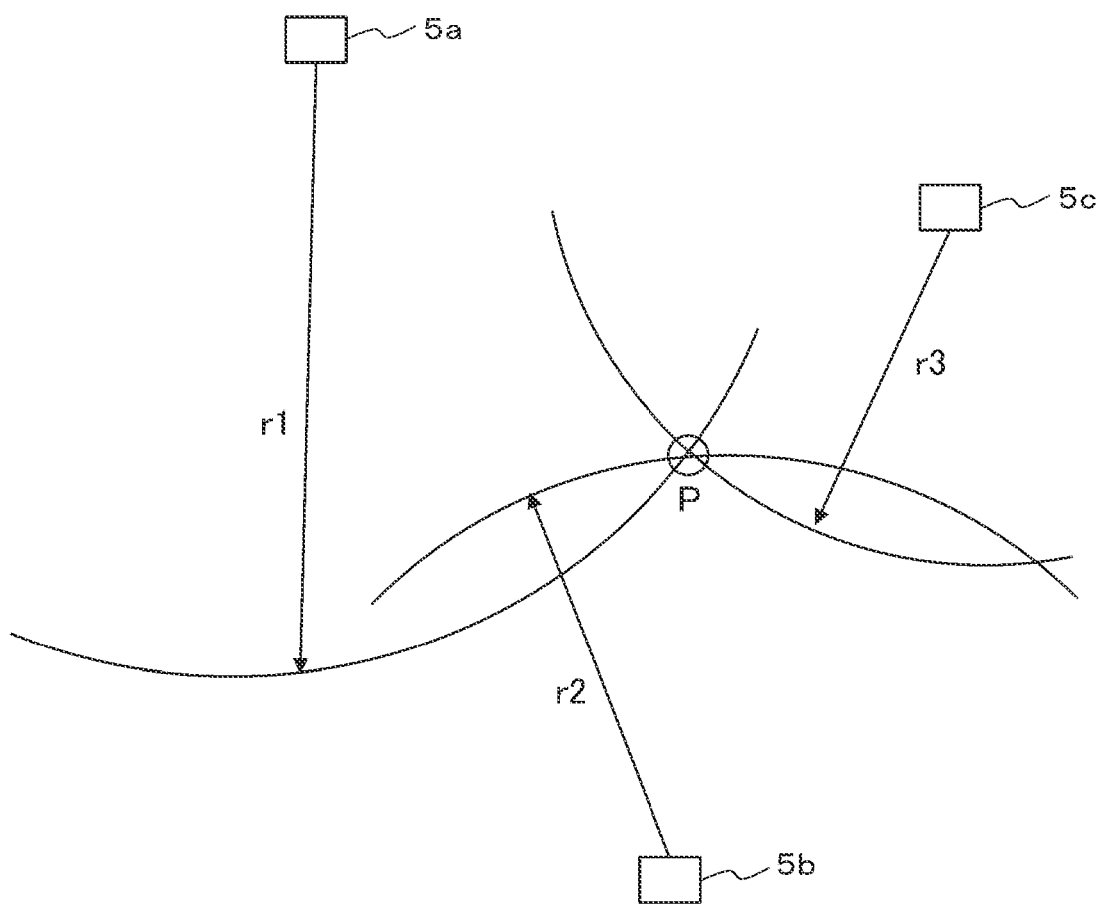
FIG. 8 is a diagram for explaining an example of detecting positions of the experiencer HMD and participant HMD.

FIG. 8 is a diagram for explaining an exemplary method of detecting the positions of the HMD 1 and HMDs 2a to 2e worn by the experiencer 11 and participants 12a to 12e. In FIG. 8, the access points 5a to 5c which are installed in the MR space 6 and whose installation positions have been already known are used to detect the positions of the HMD 1 and HMDs 2a to 2e. The position calculation method is common to the HMD 1 and HMDs 2a to 2e, and thus in the following, an example of the HMD 1 will be described.

The HMD 1 at the position of a point P, receives the network signals 10g to 10i from the access points 5a to 5c, and then calculates distances to the access points 5a to 5c based on the strength of the received signals. In FIG. 8, where a distance to the access point 5a is r1, a distance to the access point 5b is r2, and a distance to the access point 5c is r3, one point on a surface on which a spherical surface whose distance from the access point 5a is r1, a spherical surface whose distance from the access point 5b is r2, and a spherical surface whose distance from the access point 5c is r3 intersect to each other is the point P, and thus the presence range within the MR space 6 is narrowed down. The HMD 1 can identify the position of the point P based on, in addition to the information about the received strength, the height of the head on which the HMD 1 is worn, an image visible through the camera 21, and information from various sensors.

Regarding the direction in which the HMD 1 at the point P faces, that is, the direction of the line-of-sight of the experiencer 11, the orientation sensor 250 is used to define the lateral direction thereof and the acceleration sensor 252 is used to define the vertical direction thereof.

While experiencing MR, the position of the experiencer 11 varies, and also his or her line of sight changes in accordance with the motion of the head. The change above can be detected by tracing the movement using the acceleration sensor 252, the gyro sensor 251, and the like. When it is detected that the HMD 1 after moving is still, for example, position detection using the access points 5a to 5c may be performed again to reset the cumulative error in tracing using the sensors.

The method of calculating the position and direction of the HMD 1 is not limited to the method described above. For example, a method using a video marker instead of the access points 5a to 5c and also using the ranging camera 29 in addition to the equipped camera 21 may be employed so as to measure a distance to the video maker by capturing the video marker using the camera 21, or, calculate the movement based on change in the video marker captured using the camera 21.

Figure 9:
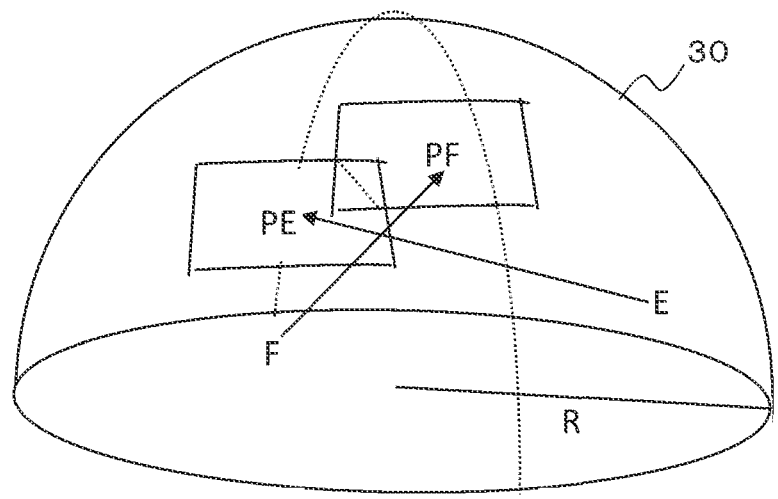
FIG. 9 is a diagram for explaining generation of a VR video.

FIG. 9 is a diagram for explaining how to generate a VR video.

In order to generate a VR video, images taken by the cameras of the experiencer HMD 1 and participant HMDs 2a to 2e are pasted on the surface of the upper hemisphere with the radius R. When any of the HMD among the experiencer HMD 1 and participant HMDs 2a to 2e, which is at the position of a point E, faces a point PE on the surface of the upper hemisphere and is taking a video, the camera-captured video is pasted to an area having the point PE on its center. In the same manner, when the HMD which is at the position of a point F faces a point PF on the surface of the upper hemisphere and is taking a video, the camera-captured video is pasted to an area having the point PF on its center. In an area where the two areas overlap to each other, the areas are stitched to each other at the borders of the objects appearing in the camera-captured videos to form a consecutive VR video. All the experiencer HMD 1 and participant HMDs 2a to 2e perform this processing. As a result, it is possible to obtain a VR video in which a video is pasted to an area which is not the entire area of the upper hemisphere but includes a line of sight of the experiencer 11 or those of the participants 12a to 12e.

In stitching the two overlapping areas to each other, correcting and finely adjusting the position and direction of the HMD so as to make the size and position of the objects at the border match and using results of the adjustment as the position and direction data of the HMD enables improvement in the accuracy of the position and direction of the HMD.

Figure 10:
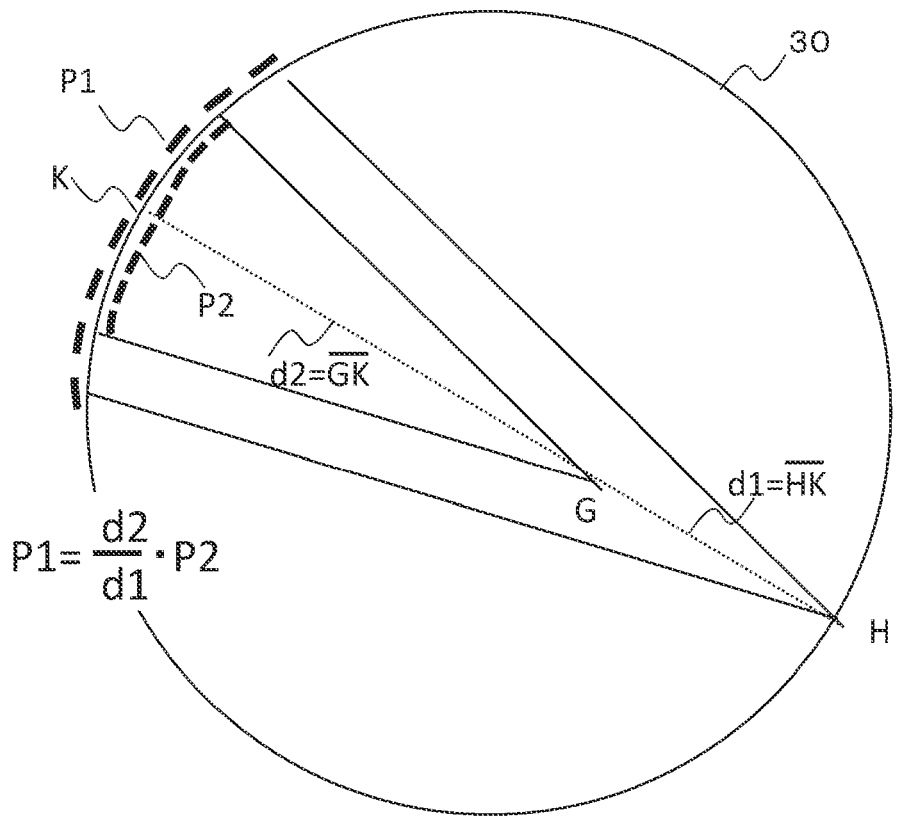
FIG. 10 is a diagram for explaining normalization of a VR video.

FIG. 10 is a diagram for explaining normalization of a VR video.

FIG. 10 illustrates a case of taking a video of a point K from a point H and a case of taking a video of the point K from a point G. In the two cases, the angle of view of the camera 21 during taking a video is the same with each other, and thus a video-taking area in the case of taking the video from the point G which is closer to the point K is narrower than the other case. Conversely, the same subject appears larger in a capturing screen. In generating a VR video for viewers, where the distance between the point G and the point K is d2 and the distance between the point H and the point K is d1 and in the case of pasting a video P2 taken from the point G to an area having the point K on its center, the video P2 is converted to a video as if it was taken from the point H on the surface of the upper hemisphere. In the case where the ratio of the two capturing ranges is d2/d1, a normalized video can be obtained by normalizing the video P2 taken from the point G at this ratio. An area for displaying the normalized video P2 is smaller than an area P1 of a video actually taken from the point H.

(MR Experience Program)

Figure 11:
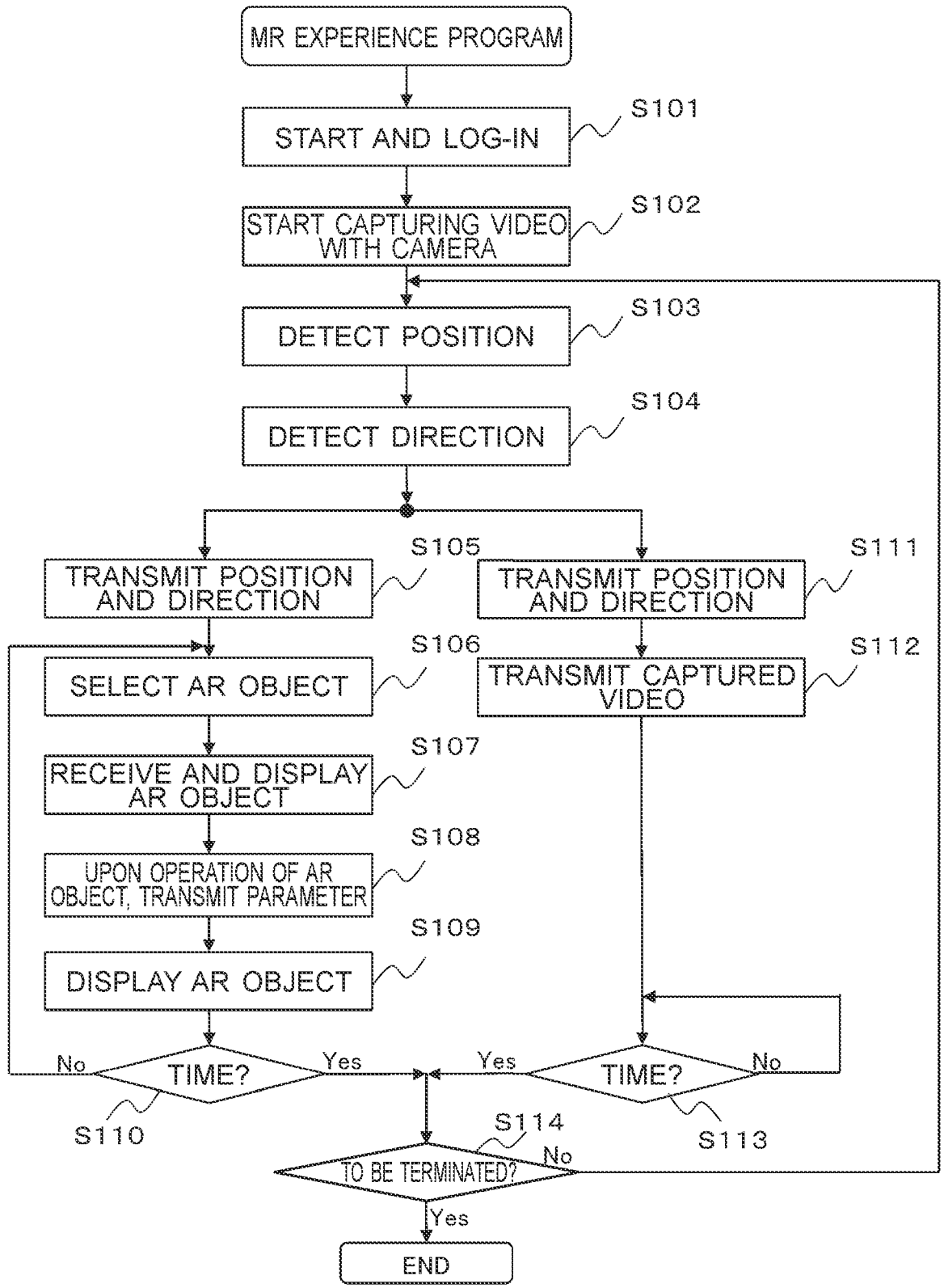
FIG. 11 illustrates a flowchart of an MR experience program.

FIG. 11 is a flowchart of the MR experience program 259.

The HMD 1 is started, and logs in to the user management processing to share the MR space 6 (step S101). The user management processing is not illustrated in the system configuration of FIG. 1, and the server for the user management processing may be provided independently, or the functions thereof may be provided in the VR server 8 and the AR server 9. Upon completion of log-in to the user management processing, the user is registered as the experiencer 11 in the VR server 8 and the AR server 9.

The camera 21 and ranging camera 29 of the HMD 1 starts capturing videos (step S102). The camera-captured video includes distance data to a real object. The video may be taken, for example, at 30 fps (frame per second) and stored, and subsequent steps may be performed in synchronization with a camera-capturing cycles.

The HMD 1 detects the position of the HMD 1 in the MR space 6 (step S103).

The HMD 1 detects a direction in which the camera 21 is taking a video (step S104). The position information about the HMD 1 and the detected direction of capturing serve as meta data of the camera-captured video.

From step S105 to step S111, the flow branches in two and the processes are performed in parallel. Step S105 to step S110 are processes related to the processing with the AR server 9, and step S111 to step S113 are processes related to the processing with the VR server 8.

In step S105, the HMD 1 transmits the data of the position and capturing direction of the HMD 1 to the AR server 9.

The HMD 1 selects an AR object to be used for the MR experience, for example, from a list stored in the AR server 9, and generates it as data to be displayed (step S106).

The HMD 1 receives the drawing data of the selected AR object and displays it on the screen 23 (step S107).

When the experiencer 11 performs an operation on the displayed AR object 4b (step S108), the HMD 1 sets parameters indicating the performed operation content, such as an arrangement position in the MR space 6, size, and orientation. The parameters such as the arrangement position, direction, and the like are relative values with the position and direction of the HMD 1 being as a reference. The HMD 1 transmits the set parameters to the AR server 9, and the AR server 9 transmits the drawing data of the AR object 4b in which the parameters are reflected to the HMD 1.

The HMD 1 receives the drawing data of the AR object 4b in which the set parameters are reflected, and displays the received data (step S109). In displaying, the HMD 1 processes the drawing data of the AR object 4b so that, in the relation such that a portion of the real object 4a is in front of a portion of the AR object 4b, based on the distance relation between the real object 4a and the AR object 4b, the portion of the AR object 4b appears hidden in the portion of the real object 4a.

The plurality of AR objects may be processed in one step, or the limited number of AR objects may be processed in one step and the processing of the whole AR objects can be performed over a plurality of camera-capturing cycles. The AR object that has been generated once remains in the MR space 6 unless the experiencer 11 cancels it. In the case where the experiencer 11 moves and thus the position and direction changes, the data of the drawn AR object to be received in step S109 includes all the AR objects which have been already generated. In step S110, the HMD 1 determines whether the camera-capturing cycle has been reached (Time), and if not yet reached (step S110: No), the HMD 1 returns the processing to step S106, and if already reached (step S110: Yes), the HMD 1 determines whether the program is to be terminated (step S114).

In parallel with step S105 to step S110, the HMD 1 transmits the data of the position and capturing direction of the HMD 1 (step S111) and camera-captured video data to the VR server 8 (step S112). The camera-captured video data is distance data between the background video taken by the camera 21 and the real object 4*a* measured by the ranging camera 29.

The HMD 1 determines whether the camera-capturing cycle is reached (step S113), stands by until the cycle has been reached (step S113: Yes), checks whether the program is to be terminated (step S114), and if not to be terminated (step S114: No), continues the steps from step S103 in the subsequent camera cycle. When it is to be terminated (step S114: Yes), the HMD 1 terminates the series of processes.

Figure 12:
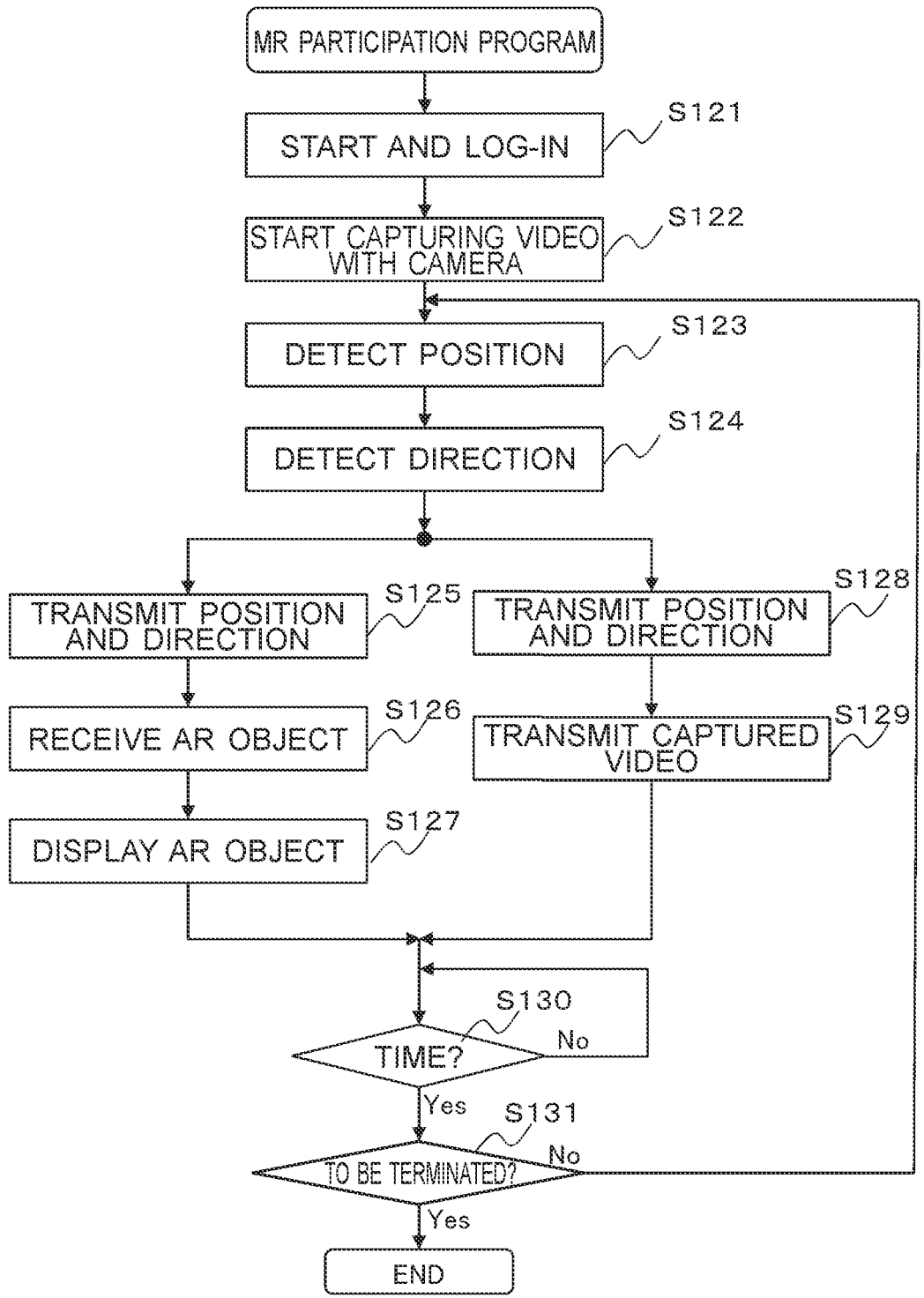
FIG. 12 illustrates a flowchart of an MR participation program.

FIG. 12 is a flowchart of the MR participation program 263. The processing illustrated in FIG. 12 is executed in the participant HMDs 2*a* to 2*e*. In the following, an example of the HMD 2*a* will be described.

The participant 12*a* wearing the participant HMD 2*a* logs into the user management processing to share the MR experience (step S121). Upon completion of log-in to the user management processing, the user is registered as a participant in the VR server 8 and the AR server 9.

The HMD 2*a* starts capturing videos with the camera 21 mounted on the HMD 2*a* (step S122). The HMD 2*a* may perform the subsequent steps in synchronization with the camera-capturing cycle.

The HMD 2*a* detects the position of the HMD 2*a* in the MR space 6 (step S123).

The HMDs 2*a* detects a direction in which the camera is taking a video (line of sight of the participant) of the HMD 2*a* (step S124) and associates it with the camera-captured video.

Step S125 to step 127 are processes related to the processing with the AR server 9, and step S128 to step S129 are processes related to the processing with the VR server 8.

The HMD 2*a* transmits the data of the position and direction of the HMDs 2*a* to the AR server 9 (step S125), receives the drawing data of the AR object generated by the experiencer from the AR server 9 (step S126), and displays the received drawing data on the screen 23 of the HMD 2*a* (step S127).

The drawing data of the AR object 4*b* to be received is data drawn to correspond to the participant HMD 2*a* based on the data of the position and direction of the HMD 2*a* transmitted in step S125.

In displaying, the HMD 2*a* processes the drawing data of the AR object 4*b* so that, in the relation such that a portion of the real object 4*a* is in front of a portion of the AR object 4*b*, based on the distance relation between the real object 4*a* and the AR object 4*b*, the portion of the AR object 4*b* appears hidden in the portion of the real object 4*a*.

Figure 13:
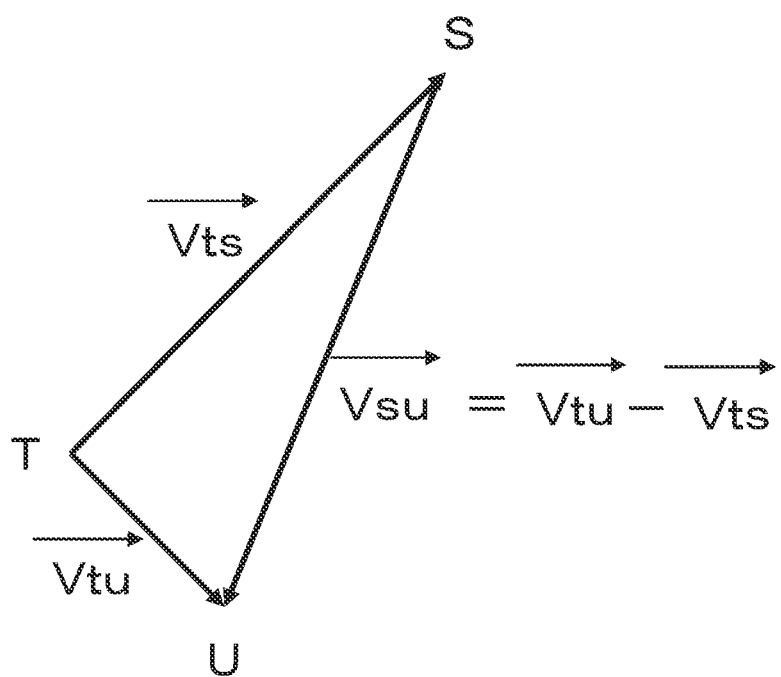
FIG. 13 is a diagram for further explaining a position of an AR object.

FIG. 13 is a diagram for further explaining the position of the AR object 4*b*.

The experiencer 11 is at a position T and generates the AR object 4*b* at a position U. The magnitude of a vector Vtu from the point T to the point U is the distance between the experiencer 11 and the AR object 4*b*. At this time, it is assumed that the participant 12*a* is at a position S and views the AR object 4*b*. Where the vector between the position T of the experiencer 11 and the position S of the participant 12*a* is Vts, a vector Vsu between the position S of the participant 12*a* and the position U of the AR object 4*b* is given by (vector Vtu-vector Vts). Thus, the distance between the participant 12*a* and the AR object 4*b* is determined based on the magnitude of the vector Vsu, and in displaying the AR object 4*b* on the participant HMD 2*a*, the front and rear distance relation between the distance to the AR object 4*b* obtained based on the magnitude of the vector Vsu and the distance to the real object obtained by the ranging camera 29 is evaluated.

In parallel with step S125 to step S127, the HMD 2*a* transmits the data of the position and capturing direction of the HMD 2*a* (step S128) and camera-captured video data to the VR server 8 (step S129).

The HMD 2*a* determines whether the camera-capturing cycle is reached (step S130), stands by until the cycle has been reached (step S130: Yes), checks whether the program is to be terminated (step S131), and if not to be terminated (step S131: No), continues the steps from step S123 in the subsequent camera cycle. When it is to be terminated (step S131: Yes), the HMD 1 terminates the series of processes. (MR Viewing Program)

Figure 14:
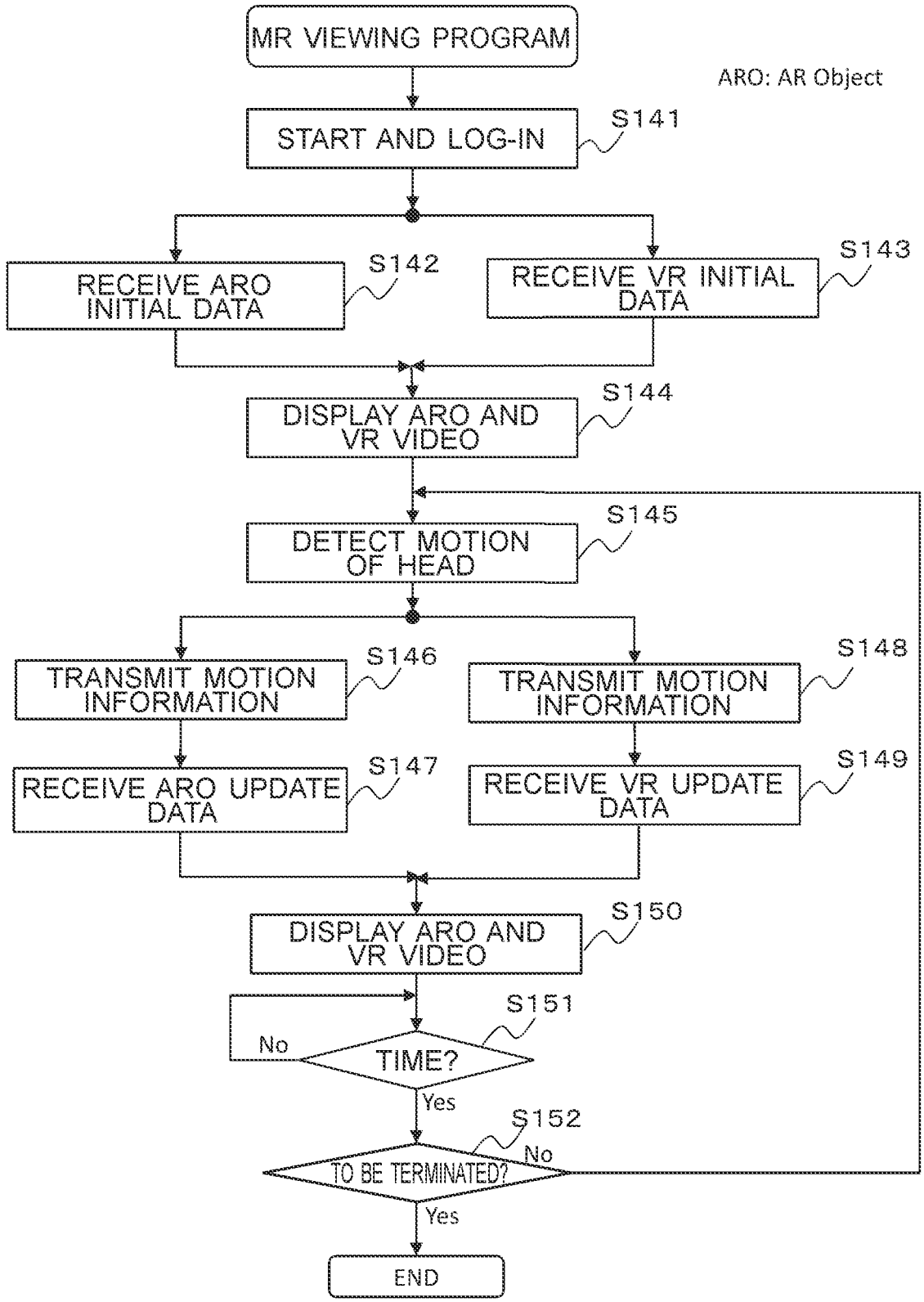
FIG. 14 illustrates a flowchart of an MR viewing program.

FIG. 14 is a flowchart of the MR viewing program 266. The processing illustrated in FIG. 14 is executed in the viewer information terminal 3*a* and the viewer HMDs 3*b*, 3*c*. Hereinafter, an example of the HMD 3*b* will be described.

The viewer 13*b* wearing the viewer HMD 3*b* logs into the user management processing to share the MR experience (step S141). Upon completion of log-in to the user management processing, the user is registered as a viewer in the VR server 8 and the AR server 9.

The HMD 3*b* receives the drawing data of the AR object 4*b* (initial data of the AR object 4*b*) from the AR server 9. In parallel therewith, the HMD 3*b* receives VR video data (VR initial data) from the VR server 8 (step S143).

The HMD 3*b* displays the AR object 4*b* and the VR video on the display 30 of the HMD 3*b* (step S144).

The AR object 4*b* and VR video in these steps are displayed, as if the HMD 3*b* was at a default origin, for example, at a position and in a direction which oppose the experiencer 11 on the surface of the upper hemisphere.

The VR video data includes, for each real object 4*a*, the meta data of the positions and directions of the HMD 1 and HMDs 2*a* to 2*e* that have performed capturing and the distance data to the real object 4*a*. The VR server 8 calculates the distance to the real object 4*a* based on the relation between the positions of the HMD 1 and HMDs 2*a* to 2*e* that have performed capturing and the position of viewpoint of a viewer of the viewer HMD 3*b* (viewpoint position is obtained by detecting the motion of the head of the viewer).

Then, the AR server 9 corrects the distance to the AR object 4*b* based on the position of the AR object 4*b* and the relation between the real object 4*a* and the viewpoint position of the viewer HMDs 3*b*. At this time, the AR server 9 process the drawing data of the AR object 4*b* so that, in the relation such that a portion of the real object 4*a* is in front of a portion of the AR object 4b, the portion of the AR object 4b appears hidden in the portion of the real object 4a.

Note that the default position and direction of the HMD 3b may be changed to the position and direction set by the viewer 13b, and the position and direction after being changed and set may be used as a starting point when the MR viewing program is started.

The viewer 13b moves his or her head while viewing the VR video, whereby the viewpoint and line of sight of the viewer 13b is moved. When the HMD 3b detects that the head has been rotated to the left, the VR server 8 causes the VR video to shift to the right relatively. When the HMD 3b detects that the head has been moved forward, the HMD 3b enlarges the VR video and displays it. This creates the MR experience that makes the viewer 13b feel as if he or she had approached.

The HMD 3b detects the motion of the head of the viewer 13b using the orientation sensor 250, the gyro sensor 251, the acceleration sensor 252, and the like. The HMD 3b transmits the detected motion information to the AR server 9 (step S146), and also transmits it to the VR server 8 (step S148).

The HMD 3b receives update data of the AR object 4b viewed from the position and direction of the viewpoint of the HMD 3b of the viewer 13b based on the transmitted motion information (step S147). Furthermore, the HMD 3b receives, from the VR server 8, update data of the VR video viewed from the position and direction of the viewpoint of the HMD 3b of the viewer 13b (step S149).

In the same manner as the process in step S144, the HMD 3b superimposes the AR object 4b and the VR video and displays them, considering the distance relation between the real object 4a and the AR object 4b (step S150). This allows the viewer 13b to view the MR experience.

The HMD 3b determines whether a displaying period has been reached based on an update unit (frame rate) of an image frame (step S151), stands by until the period is reached (step S151: Yes), checks whether the MR viewing program is to be terminated (step S152), and if not to be terminated (step S152: No), continues the steps from step S145 in the subsequent display period. When the MR viewing program is to be terminated (step S152: Yes), the HMD 3b terminates the series of processes.

Figure 15:
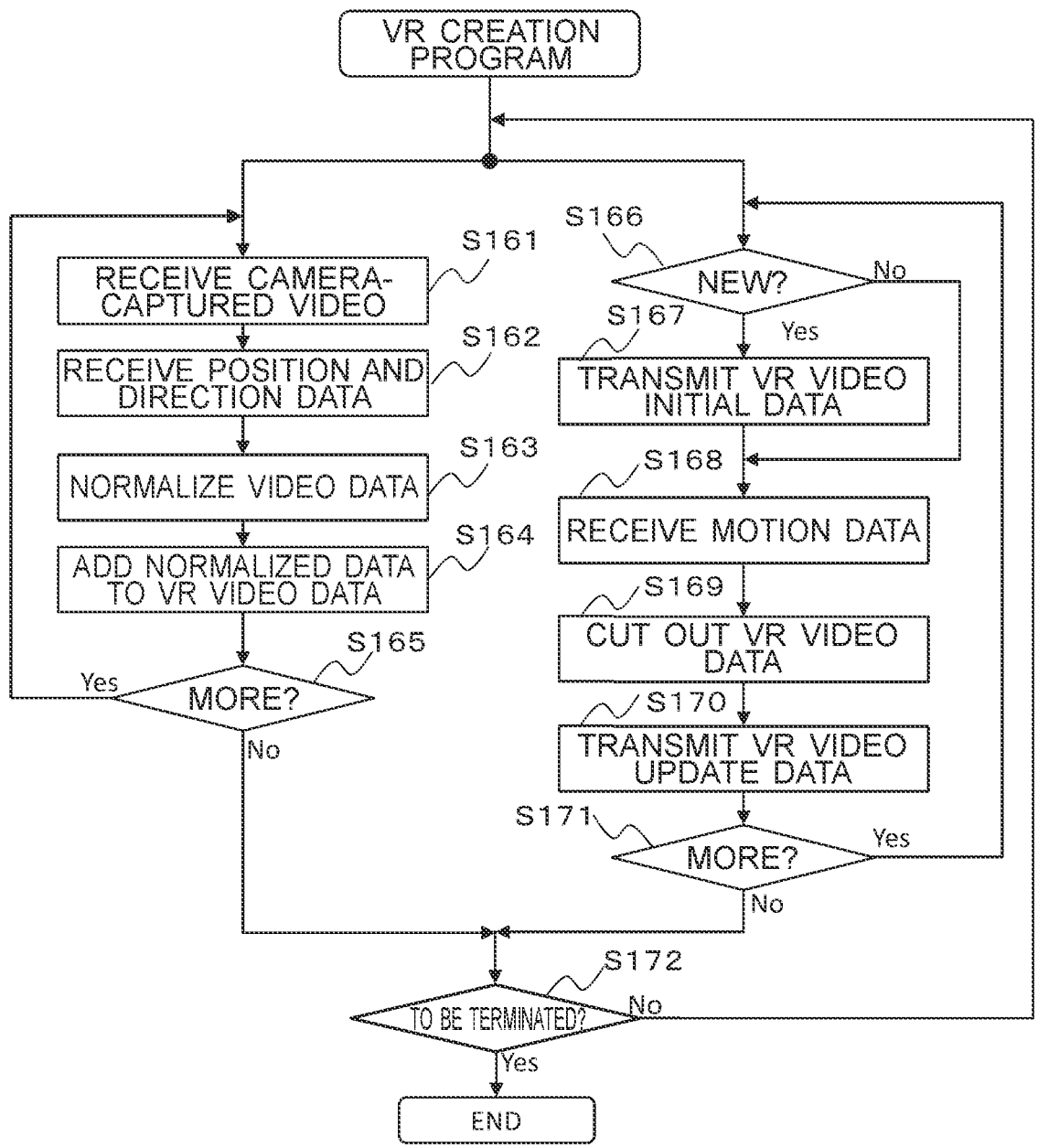
FIG. 15 illustrates a flowchart of a VR creation program.

FIG. 15 is a flowchart of the VR creation program 85.

Various types of processing are provided to the registered HMD 1 of experiencer 11, HMDs 2a to 2e of participants 12a to 12e, and the information terminal 3a and HMDs 3b, 3c of the viewers 13a to 13c. The processing by the VR creation program 85 includes the receiving processes in step S161 to step S165 and the transmitting processes in step S165 to step S171.

The VR server 8 provides the HMD 1 and HMDs 2a to 2e of the experiencer 11 and participants 12a to 12e with the receiving processes.

The VR server 8 receives the camera-captured video data of the HMD 1 and HMDs 2a to 2e (step S161), together with the data of the positions and directions of the HMDs that have generated the camera-captured videos (step S162).

The VR server 8 normalizes the received camera-captured video data (step S163), and pastes it on the upper hemispherical surface to add it to the VR video data (step S164).

The VR server 8 switches to the HMD which has transmitted a request to receive the camera-captured video data (step S165: Yes), and returns the processing to step S161. In the case where there is no HMDs transmitting a receiving request (step S165: No), the VR server 8 determines whether the processing is to be terminated (step S172).

The VR server 8 provides the information terminal 3a and HMDs 3b, 3c of the viewers 13a to 13c with the transmitting processes.

The VR server 8 determines whether a target to be provided with transmission is a new apparatus (step S166), and when the transmission providing target is a new apparatus (step S166: Yes), acquires start point data of the transmission providing target and transmits the initial data of the VR video thereto (step S167).

When the transmission providing target is not a new apparatus (step S166: No) or after having transmitted the initial data of the VR video (step S167), the VR server 8 receives, from the HMD that is the transmission providing target, motion data indicating the motion of the transmission providing target HMD (step S168).

The VR server 8 calculates the position and direction of the transmission providing target HMD and the like based on the motion data, cuts out a portion of an area from the VR video data of the upper hemispherical surface (step S169), and transmits the cut-out VR video data (VR video update data) to the transmission providing target HMD (step S170).

In the case another HMD or information terminal is requesting transmission of the VR video data (step S171: Yes), the VR server 8 switches to the other transmission providing target HMD (or information terminal) and returns the processing to step S166. In the case where there is no other HMDs or information terminals requesting transmission (step S171: No), the VR server 8 determines whether the processing is to be terminated (step S172). Upon receiving an instruction to terminate the processing (for example, in the case of receiving the termination of the MR experience from the HMD 1 of the experiencer 11), the VR server 8 terminates the processing (step S172: Yes).

In absence of an instruction to terminate the processing (step S172: No), the VR server 8 returns the processing to the process immediately after the start of the processing, and continues the processes in step S161 and step S166.

(AR Drawing Program)

Figure 16:
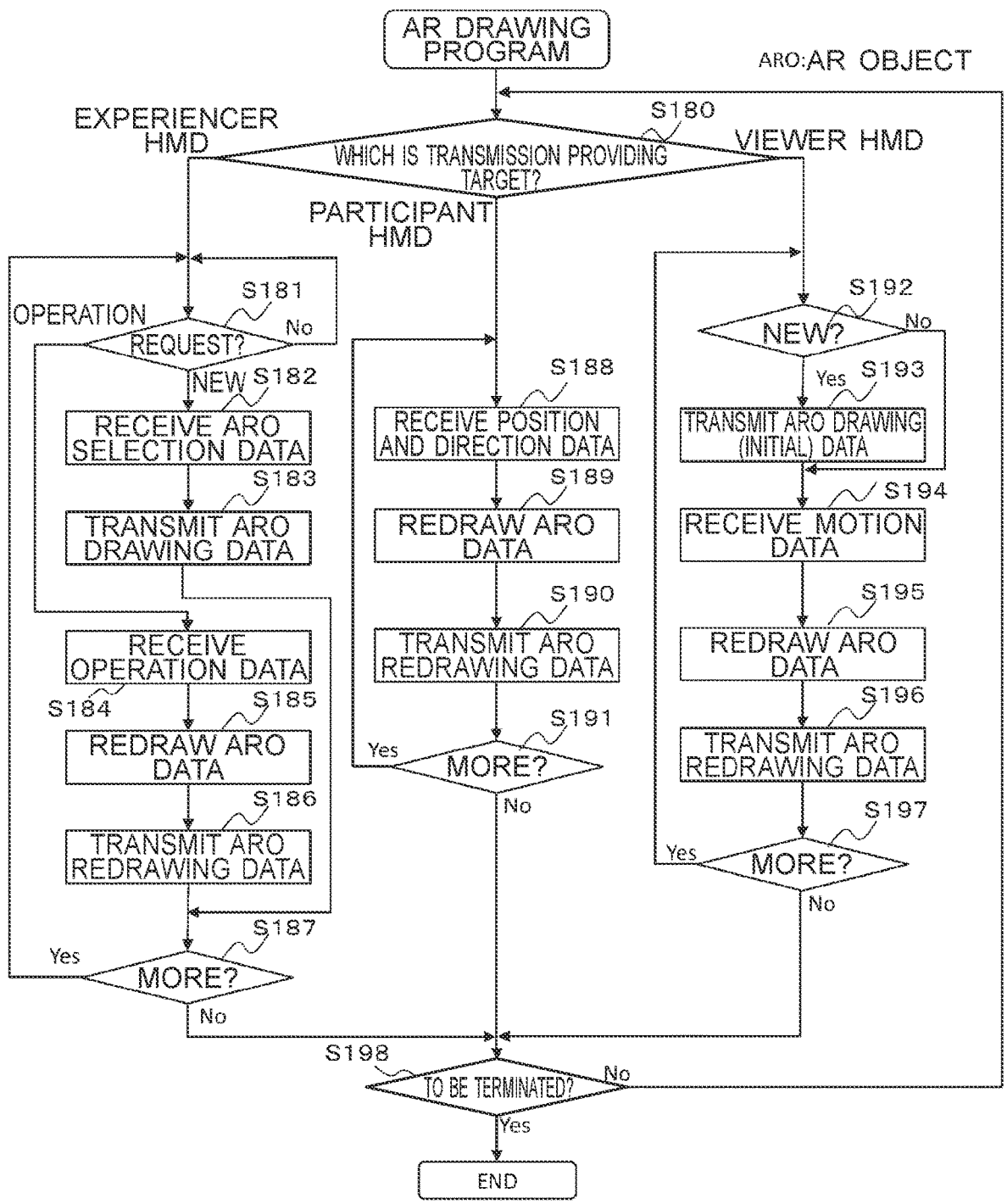
FIG. 16 illustrates a flowchart of an AR drawing program.

FIG. 16 is a flowchart of the AR drawing program 95.

The AR server 9 provides the HMD 1, HMDs 2a to 2e, HMDs 3b, 3c, and information terminal 3a of the registered experiencer 11, participants 12a to 12e, and viewers 13a to 13c with various types of processing. The processing by the AR server 9 mainly includes the processes in step S181 to step S187 to be provided to the experiencer HMD 1, the processes in step S188 to step S191 to be provided to the participant HMDs 2a to 2e, and the processes in step S192 to step S197 to be provided to the viewer HMDs 3b, 3c and the information terminal 3a.

In step S181, the AR server 9 determines whether a request has been transmitted from the experiencer HMD, and determines the type thereof. In absence of transmission of a request (step S181: No), the AR server 9 stands by until a request is transmitted.

In the case of a new request (step S181: new), the AR server 9 receives selection data of the AR object from the HMD 1 (step S182), and transmits the default drawing data of the selected AR object (step S183). Then, the AR server 9 proceeds the processing to step S187.

In the case of an operation request (step S181: operation), the AR server 9 receives the data of the operation parameters from the HMD 1 (step S184), redraws the AR object in accordance with the operation parameters (step S185), and transmits the data of the redrawn AR object to the HMD 1 (step S186) Then, the AR server 9 proceeds the processing to step S187.

In step S187, the AR server 9 determines whether a subsequent request has been received. Upon receiving a subsequent request (step S187: Yes), the AR server 9 continues the processing, and if not receiving (step S187: No), the AR server 9 proceeds the processing to the termination determination (step S198).

In step S188, the AR server 9 receives the data of the position and direction of the registered one (transmission target participant HMD) of the participants HMDs 2a to 2e. Then, the AR server 9 redraws the AR object 4b being selected by the HMD 1 of the experiencer 11 in accordance with the data of the position and direction received in step S188 (step S189), and transmits the data of the redrawn AR object to the transmission target participant HMD (step S190).

In step S191, in the case where the registered participant HMDs 2a to 2e are left unprocessed or the position and direction of the registered participant changes (step S191: Yes), the AR server 9 returns the processing to step S188. In the case where all the registered participant HMDs 2a to 2e have been processed (step S191: No), the AR server 9 proceeds the processing to the termination determination (step S198).

In step S192, the AR server 9 determines whether the information terminal 13a of the viewer 3a or the viewer HMDs 3b or 3c which is a transmission providing target is a new apparatus (step S192). When the transmission providing target is a new apparatus (step S192: Yes), the AR server 9 transmits the initial data of the AR object 4b thereto (step S193). In the same manner as the case of the VR video, the initial data is, for example, data drawn on the upper hemisphere surface assuming a position and a direction which oppose the HMD 1 for the experiencer 11.

When it is not a new apparatus (step S192: No) or after having transmitted the ARO drawing (initial) data (step S193), the AR server 9 receives data of motion information about a viewer terminal that is a transmission providing target, for example, the HMD 3b (step S194), and calculates the position and direction of the transmission providing target viewer terminal. Then, the AR server 9 redraws the AR object 4b in accordance with the received motion data (step S195), and transmits the data of the redrawn AR object to the transmission providing target viewer terminal (step S196).

The AR server 9 determines whether any other transmission providing target viewer terminal is left unprocessed. When it remains (step S197: Yes), the AR server 9 returns the processing to step S192, and when all the transmission providing target viewer terminals have been processed (step S197: No), the AR server 9 proceeds the processing to the termination determination (step S198).

The AR server 9 determines whether the processing is to be terminated (step S198). Upon receiving a termination instruction, the AR server 9 terminates a series of processes (step S198: Yes). In absence of a termination instruction (step S198: No), the AR server 9 returns the processing to step S180 and continues the processing.

In the above, the case where the HMD 1, HMD 2a to 2e, HMD 3b, 3c and the information terminal 3a process the drawing data of the AR object 4b so that, in the relation such that a portion of the real object 4a is in front of a portion of the AR object 4b, based on the distance relation between the real object 4a and the AR object 4b, the portion of the AR object 4b appears hidden in the portion of the real object 4a has been described. However, the processing above may be performed by the AR server 9. In this case, in the processing on each of the HMD 1, HMD 2a to 2e, HMD 3b, 3c, and the information terminal 3a, a step of transmitting, in addition to the data of the position and direction, data of the real object 4a included in the VR video data acquired from the VR server 8 to the AR server 9 is added. More particularly, the data to be transmitted is video data that is created from the viewpoint of how the real object 4a is visible, based on a composite video of a plurality of pieces of capturing data using the data of the positions and directions based on each of the HMDs. Meanwhile, in the processing on the AR server 9, a step of receiving the data above from each of the HMD 1, HMD 2a to 2e, HMD 3b, 3c and the information terminal 3a is added.

Figure 17:
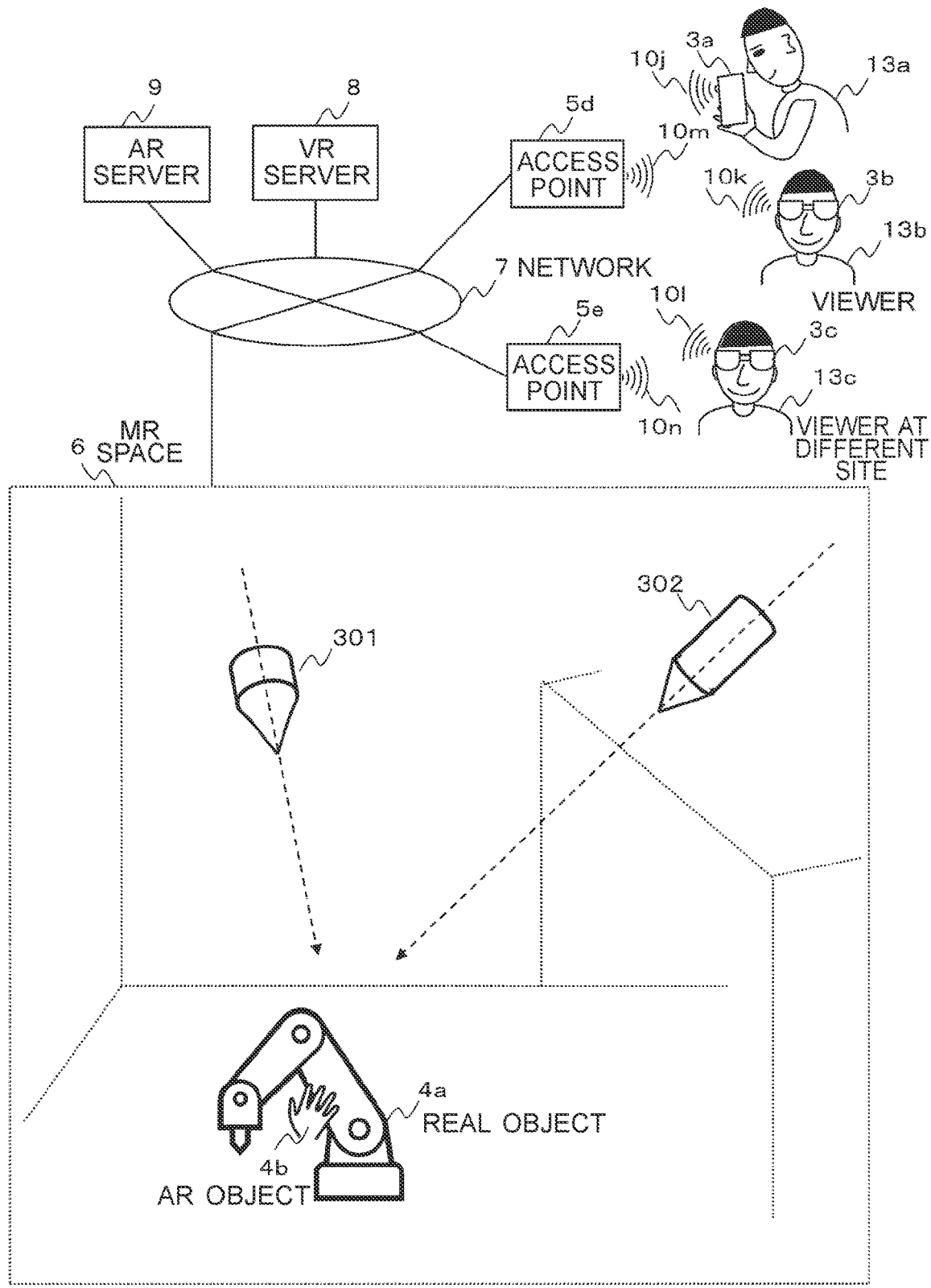
FIG. 17 illustrates an exemplary method of selecting a position of a viewpoint by a viewer.

FIG. 17 illustrates an exemplary method of selecting a position of a viewpoint when the viewers 13a to 13c view a VR video. In particular, setting a viewpoint for viewing the real object 4a and the AR object 4b enables the viewer to observe the real object 4a and the AR object 4b with his or her preferable viewpoint.

Three-dimensional arrows 301, 302 are examples of pointers for selecting a viewpoint position and a line-of-sight direction. The viewer operates the three-dimensional arrows 301, 302 to select which position of a viewpoint in the MR space 6 is to be used for viewing a VR video. At this time, the viewer is allowed to specify which line of sight direction is to be selected with the broken lines. Furthermore, rotating the MR space 6 enables the viewer to decide the positions and directions of the three-dimensional arrows 301, 302 three-dimensionally. Using pointers allowing the viewer to flexibly select the position and direction, such as the three-dimensional arrows 301, 302, enables the user to select a viewpoint position and line-of-sight direction. For example, like the case of using the three-dimensional arrows 301, 302, in the case of dividing the processing of flexibly selecting a position and direction into two steps, firstly, determining the positions of the three-dimensional arrows 301, 302 and then changing the line-of-sight directions of the three-dimensional arrows 301, 302, an operation of grasping arrow portions at the tips of the dotted lines and moving them may be performed to determine the directions.

In the viewer HMDs 3b, 3c or the viewer information terminal 3a, an input interface, for example, in the case of audio input, the microphone 27 or a switch (not illustrated in FIG. 5) is used to enter a mode for displaying a pointer for allowing the viewer to select a line-of-sight position and line-of-sight direction, and in such a mode, the three-dimensional arrow is displayed. When the mode above is terminated, display of three-dimensional arrow is cancelled, and instead, the display is switched to a video from the selected line-of-sight position and line-of-sight direction.

According to the virtual reality sharing system 100 of the first embodiment, the viewers 13a to 13c at the remote site can view the MR experience using the VR video generated from the camera-captured videos by the experiencer 11 and participants 12a to 12e. The VR video can be generated based on the camera-captured videos viewed from various angles, and thus the viewers 13a to 13c can continuously and approximately arbitrarily select the line of sight.

Furthermore, the virtual reality sharing terminals (HMD 1, HMDs 2a to 2e) for the experiencer 11 and participants 12a to 12e contribute to generation of a VR video, and the virtual reality sharing terminals for the viewers 13a to 13c (informational terminal 3a and HMDs 3b, 3c) are able to share the MR experience using the VR video.

Second Embodiment

Figure 18:
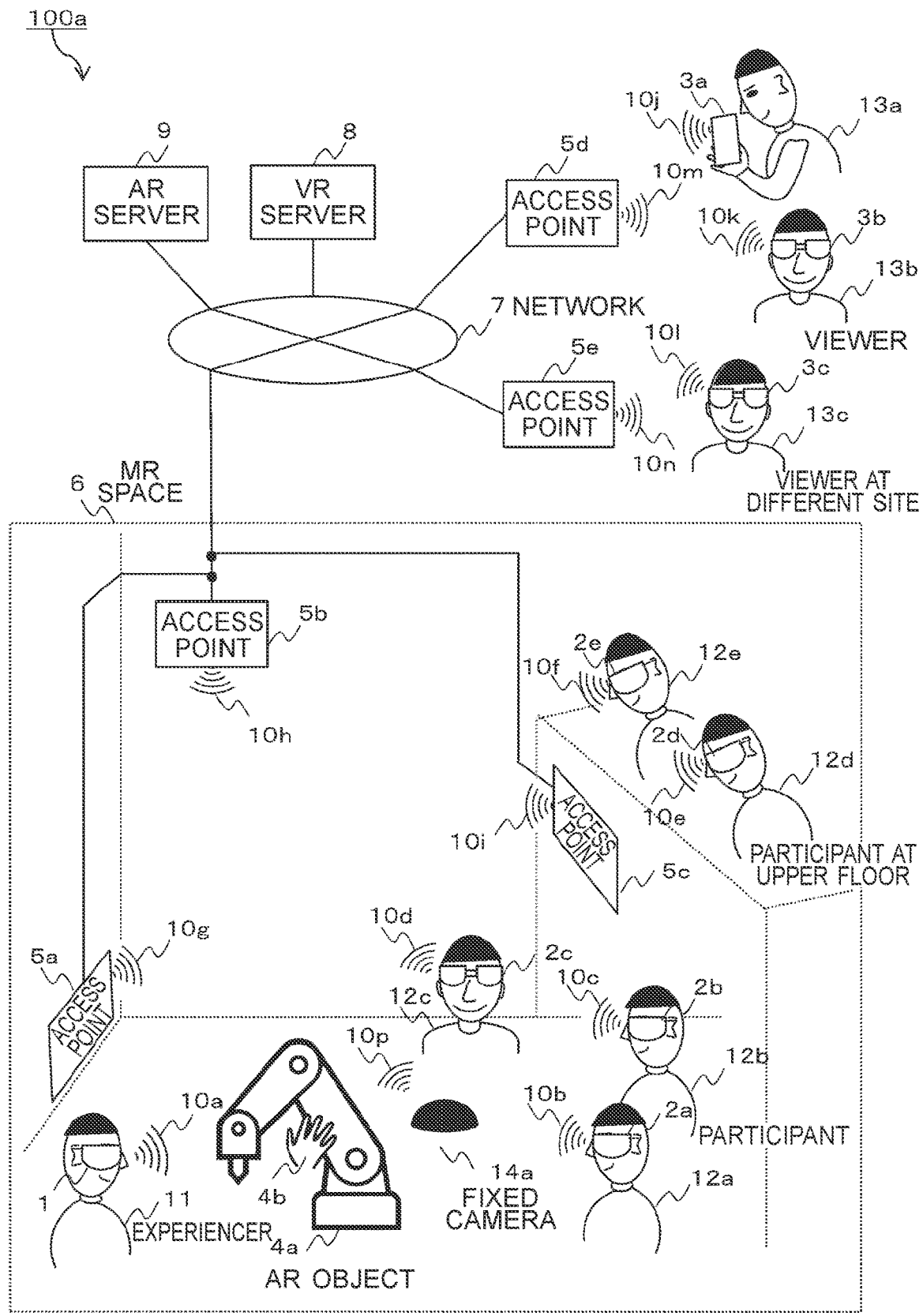
FIG. 18 is a schematic diagram of a virtual reality sharing system according to a second embodiment.

FIG. 18 is a schematic diagram of a virtual reality sharing system 100a according to a second embodiment. The virtual reality sharing system 100a according to the second embodiment is different from the virtual reality sharing system 100 according to the first embodiment illustrated in FIG. 1 in that a fixed camera 14 is arranged. The captured video by the fixed camera 14 is provided to the VR server 8 using the network signal 10p, and is used as video data for creating a VR video together with the camera-captured videos taken by the virtual reality sharing terminals for the experiencer 11 and participants 12a to 12e.

As the fixed camera 14, using, for example, a 360° camera to obtain a video of an upper hemisphere enables sharing of a video of an area that cannot be covered by the virtual reality sharing terminals for the experiencer 11 and participants 12a to 12e. This allows the VR video to be generated as the video of the upper hemisphere without any breaks, and thus the VR video having no break can be observed as a background video from the virtual reality sharing terminals of the viewers 13a to 13c. Furthermore, in the case where the virtual reality sharing terminals for the experiencer 11 and participants 12a to 12e can partially capture images which are high-definition more than the 360° camera, combining these images enables provision of a high-quality VR video.

Figure 19:
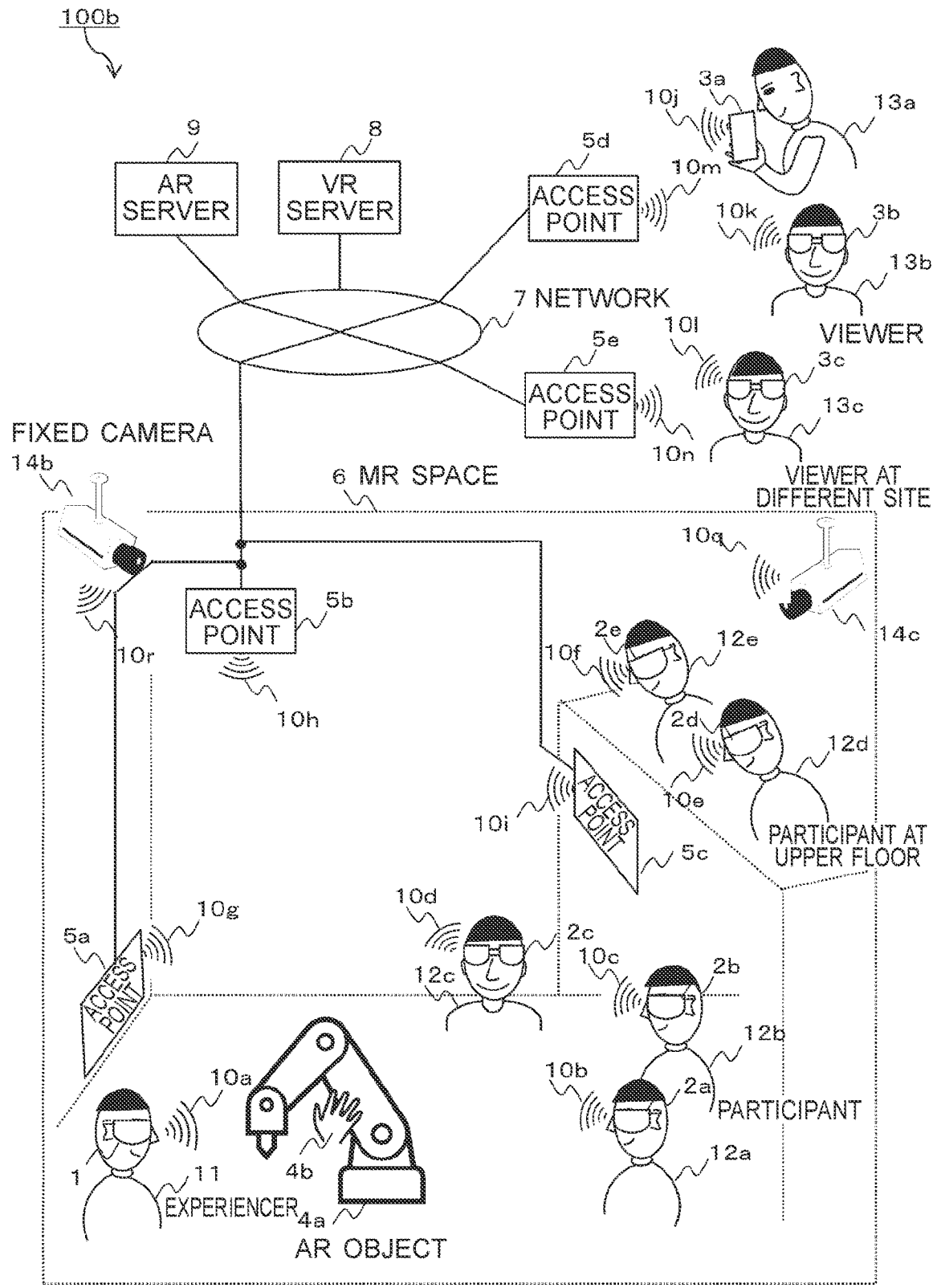
FIG. 19 is a schematic diagram of a modification of the virtual reality sharing system according to the second embodiment.

FIG. 19 is a schematic diagram of a modification of a virtual reality sharing system 100b. The virtual reality sharing system 100b differs from the virtual reality sharing system 100a in that fixed cameras 14b, 14c each having a limited angle of view are arranged instead of the fixed camera 14a that is a 360° camera.

FIG. 19 illustrates only the fixed cameras 14b, 14c, however, preferably, the fixed cameras are arranged at the four corners of the MR space 6, respectively, to cover the entire MR space to be captured. Alternatively, the fixed cameras are arranged so that videos of the entire object can be captured from many directions. The captured videos by the fixed cameras 14b, 14c are provided to the VR server 8 using network signals 10q, 10r, and used as video data for creating a VR video together with the camera-captured videos captured by the virtual reality sharing terminals for the experiencer 11 and participants 12a to 12e.

According to the virtual reality sharing system 100b, a relatively high-quality VR video can be obtained as compared with the case of the virtual reality sharing system 100a.

Furthermore, in the virtual reality sharing system 100a, a VR video that can be obtained is the one as if a video is pasted on the inside of the upper hemispherical surface, and thus the viewers 13a to 13c can obtain the VR video with the viewpoint being set to the inside, whereas in the virtual reality sharing system 100b, the viewers 13a to 13c can obtain the VR video with the AR object 4b as the center and the viewpoint being outside the AR object 4b.

As described above, according to the second embodiment, the same advantageous effects as those of the first embodiment can be obtained with a small number of additional facilities. Furthermore, it is possible to obtain a VR video, in which videos are pasted on the entire upper hemispherical surface and has the viewpoint inside thereof, and a VR video having an object on the center and the viewpoint from the outside, whereby the entire MR space 6 can be easily grasped from the virtual reality sharing terminal for the viewers 13a to 13c.

Third Embodiment

Figure 20:
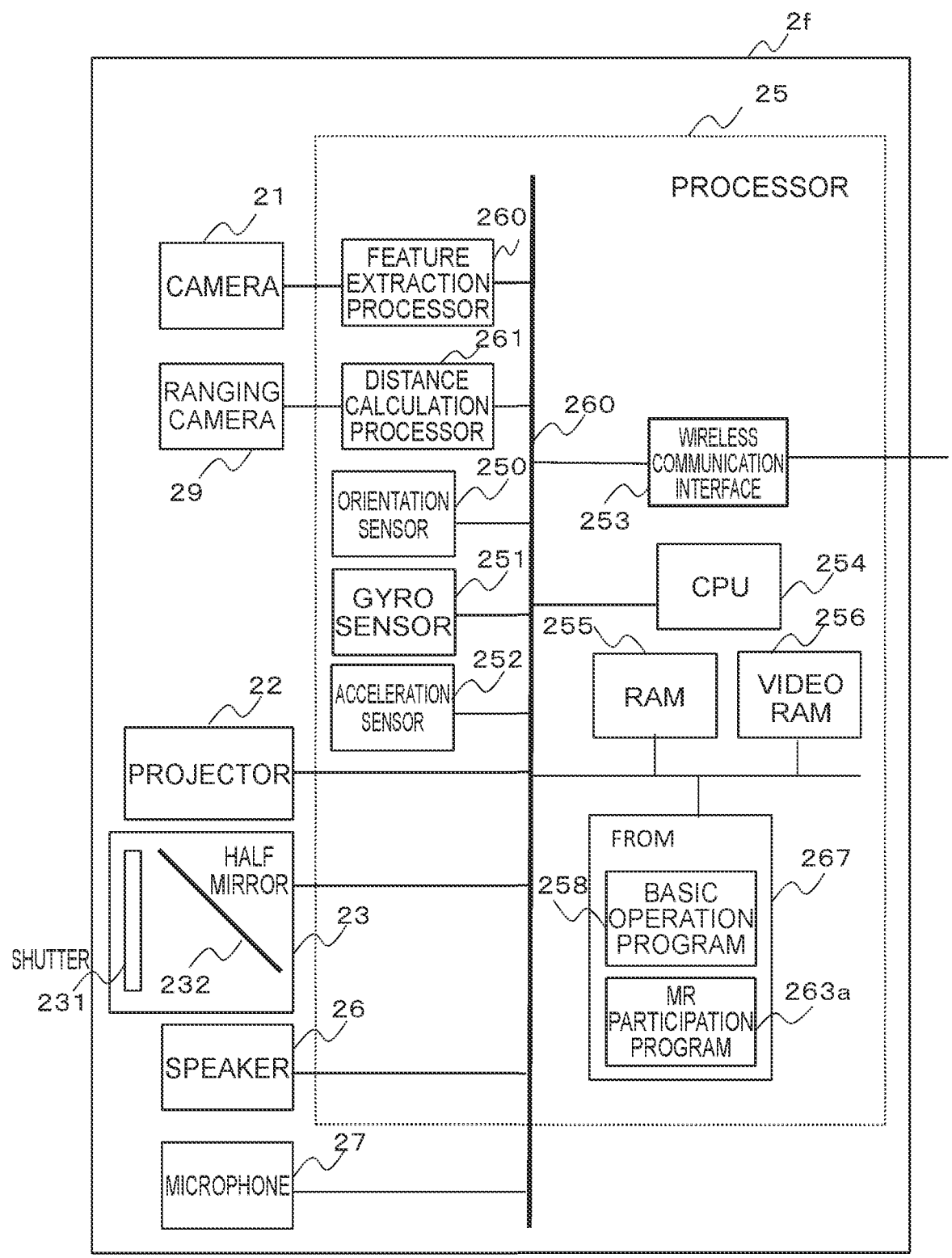
FIG. 20 is a block diagram of a participant HMD of the virtual reality sharing system according to a third embodiment.

FIG. 20 is a block diagram of a participant HMD 2f of a virtual reality sharing system according to a third embodiment. In the third embodiment, the virtual reality sharing systems 100, 100b, 100c illustrated in FIG. 1, FIG. 18, and FIG. 19 use a participant HMD 2f instead of the participant HMDs 2a to 2e of the first and second embodiments.

The screen 23 of the participant HMD 2f differs from the participant HMDs 2a to 2e according to the first and second embodiments in that it includes a shutter 231 and a half mirror 232.

When the shutter 231 is controlled to the open state, the participant HMD 2f functions as a transparent type HMD. That is, the background video of the real space and the AR object 4b projected from a projector 22 (generic term for the left-projector 22a and right-projector 22b) can be viewed on the half mirror 232.

On the other hand, when the shutter 231 is controlled to the close state, the AR object 4b and the VR video are superimposed and projected from the projector 22. In this case, the participant HMD 2f functions as an immersive type HMD. In the same manner as the viewers 13a to 13c, this allows the participants 12a to 12e to flexibly select a viewpoint position and line-of-sight direction to experience the MR viewing.

Figure 21:
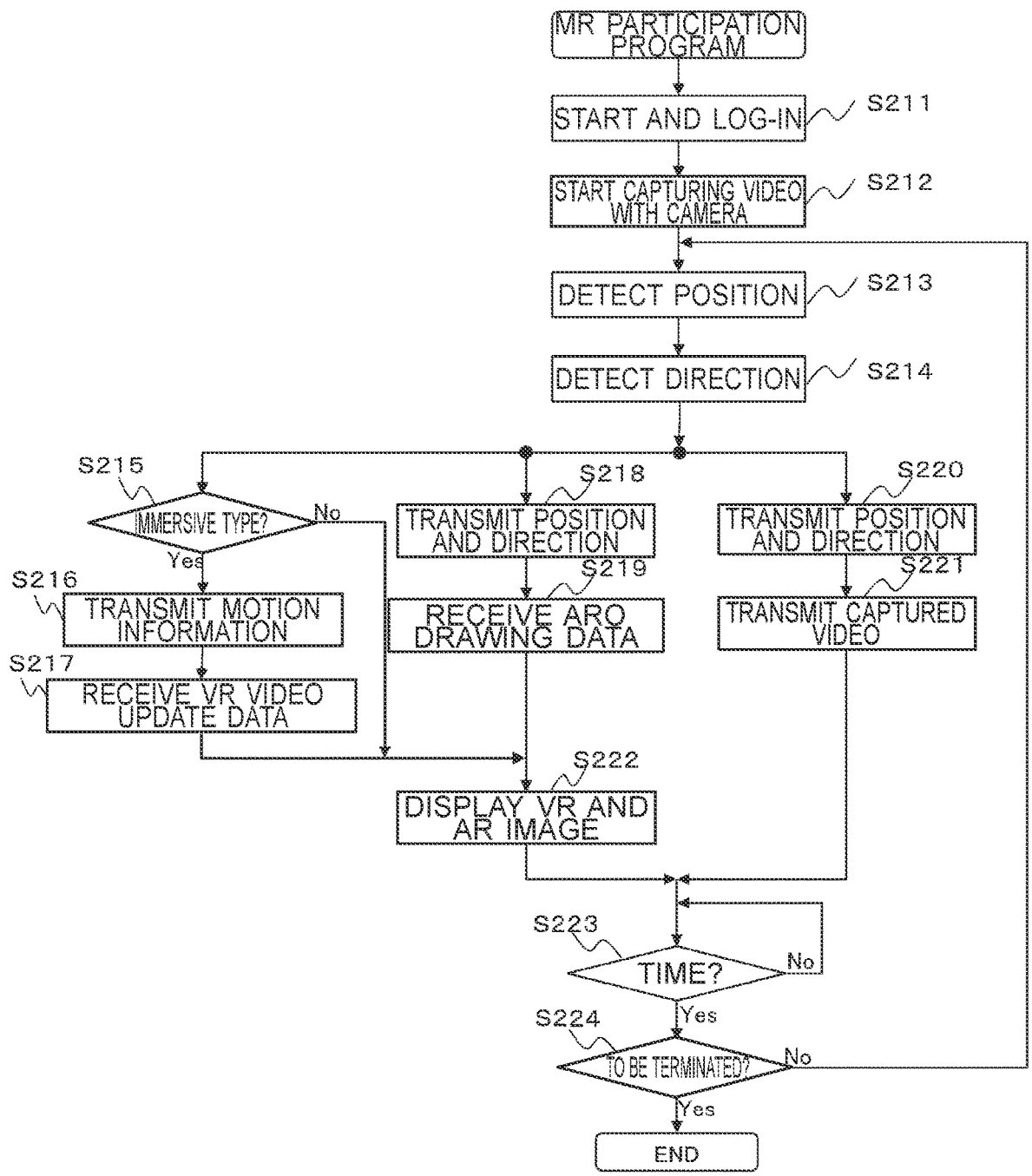
FIG. 21 illustrates a flowchart of an MR participation program according to the third embodiment.

FIG. 21 is a flowchart of an MR participation program 263a.

After being started, the HMD 2f logs into the user management processing to share the MR experience (step S211). Upon completion of log-in to the user management processing, the user is registered as a participant in the VR server 8 and the AR server 9.

The HMD 2f starts taking a video with cameras (step S212). The HMD 2f may perform the subsequent steps in synchronization with the camera-capturing cycle.

The HMD 2f detects the HMD position in the MR space (step S213), detects the capturing direction of the camera of the HMD 2f (step S214), and associates them as meta data of the camera-captured video.

In step S218, the HMD 2f transmits the data of the position and direction of the HMD 2f to the AR server 9. The HMD 2f receives the drawing data of the AR object 4b generated by the experiencer 11 (step S219).

In the case where the shutter 231 is closed (step S215: Yes), the HMD 2f can be used as an immersive type HMD. In this case, the HMD 2f transmits the motion information about the HMD 2f to the VR server 8 (step S216), receives the VR video data that corresponds to the motion information from the VR server (step S217), and proceeds the processing to step S222.

In the case where the shutter 231 is open (step S215: No), the HMD 2f can be used as a transparent type HMD. This case does not require VR videos, and thus the HMD 2f proceeds the processing to step S222.

In step S222, the HMD 2f superimposes the AR object 4b on the VR video received in step S217. On the other hand, in the case of being used as a transparent type HMD, the HMD 2f merely projects the AR object 4b onto the screen 23, whereby the AR object 4b is superimposed on the background video viewed transparently through the shutter 231 and the half mirror 232. Then, the HMD 2f proceeds the processing to step S223.

Here, it is determined whether the HMD 2f is inside or outside the MR space 6 by using the distances from the access points 5a to 5c. When the HMD 2f is in the MR space 6, the user can select either an immersive type or a transparent type via the input interface. When it is determined that the HMD 2f is outside the MR space 6, the HMD 2f is automatically switched to the immersive type (shutter 231 is closed).

In step S220, the HMD 2f transmits the data of the position and direction of the HMD 2f (step S220) and camera-captured video data (step S221) to the VR server 8. Then, the HMD 2f proceeds the processing to step S223.

The HMD 2f determines whether the camera-capturing cycle has been reached (step S223), stands by until the cycle is reached (step S223: Yes), checks whether the MR participation program is to be terminated, and if not to be terminated (step S224: No), continues the steps from step S213 in the subsequent camera cycle. When it is to be terminated (step S224: Yes), the HMD 2f terminates the processing of the MR participation program.

As described above, according to the third embodiment, the same advantageous effects as those of the first embodiment and second embodiment are obtained, and moreover, the participants 2a to 2e are allowed to switch the viewing in the MR space 6 in the same manner as the viewers 13a to 13c, between the AR viewing and the VR viewing.

Fourth Embodiment

Figure 22:
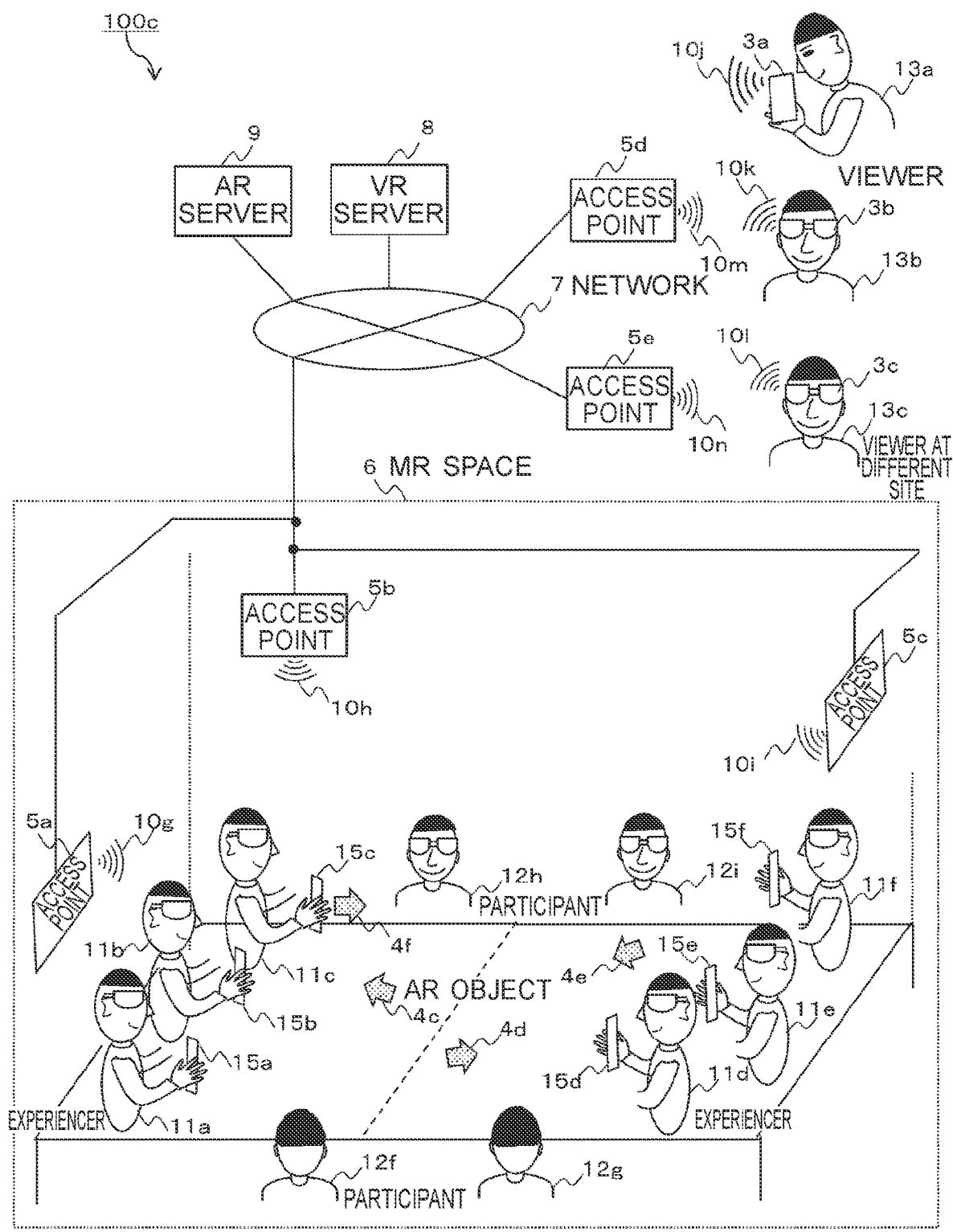
FIG. 22 is a schematic diagram of a virtual reality sharing system according to a fourth embodiment.

FIG. 22 is a schematic diagram of a virtual reality sharing system 100c according to a fourth embodiment.

In the virtual reality sharing system 100c illustrated in FIG. 22, experiencers 11a to 11f and participants 12f to 12i are present in the MR space 6.

The experiencers 11a to 11f and participants 12f to 12i wear the HMDs on their heads, respectively. The HMDs transmit and receive the network signal, which are not illustrated in FIG. 22 for preventing FIG. 22 from being complicated.

In the virtual reality sharing system 100c, the plurality of experiencers 11a to 11f is divided into the left side experiencers including the experiencers 11a to 11c and the right side experiencers including the experiencers 11d to 11f. The experiencers 11a to 11f hold operation controllers 15a to 15f, respectively, and generate and operate AR objects 4c to 4e using the operation controllers 15a to 15f. Each of the operation controllers 15a to 15f has a built-in sensor for detecting the motion thereof, and generates and moves the AR object 4c to 4e in accordance with the motion thereof.

In the virtual reality sharing system 100c, the AR objects 4c to 4e generated by the operation controllers 15a to 15f are virtual attacking objects for attacking the experiencers 11a to 11c or experiencers 11d to 11f on the opposite side. In this e-sport using the MR space 6, an experiencer hits the attacking object to the experiencers 11a to 11c or experiencers 11d to 11f on the opposite side to make the experiencer who is hit by the attacking object leave, and compete the number of experiencers the experiencer can eliminate within a predetermined period of time.

In the case where each of the participants 12f to 12i uses the participant HMD 2f according to the third embodiment to be worn as a transparent type HMD, he or she can see the experiencers 11a to 11f on both sides in the MR space 6, and also view the AR objects 4c to 4e which are superimposed thereon. In the case of using the HMD to be worn as an immersive type HMD, each of the participants 12f to 12i can view the VR video and the AR object superimposed thereon as if they were the experiencers 11a to 11f. Furthermore, in the same manner as the embodiments that have been described, the viewers 13a, 13b, 13c can flexibly select the viewpoint positions and line-of-sight directions to view the inside of the MR space 6.

Figure 23:
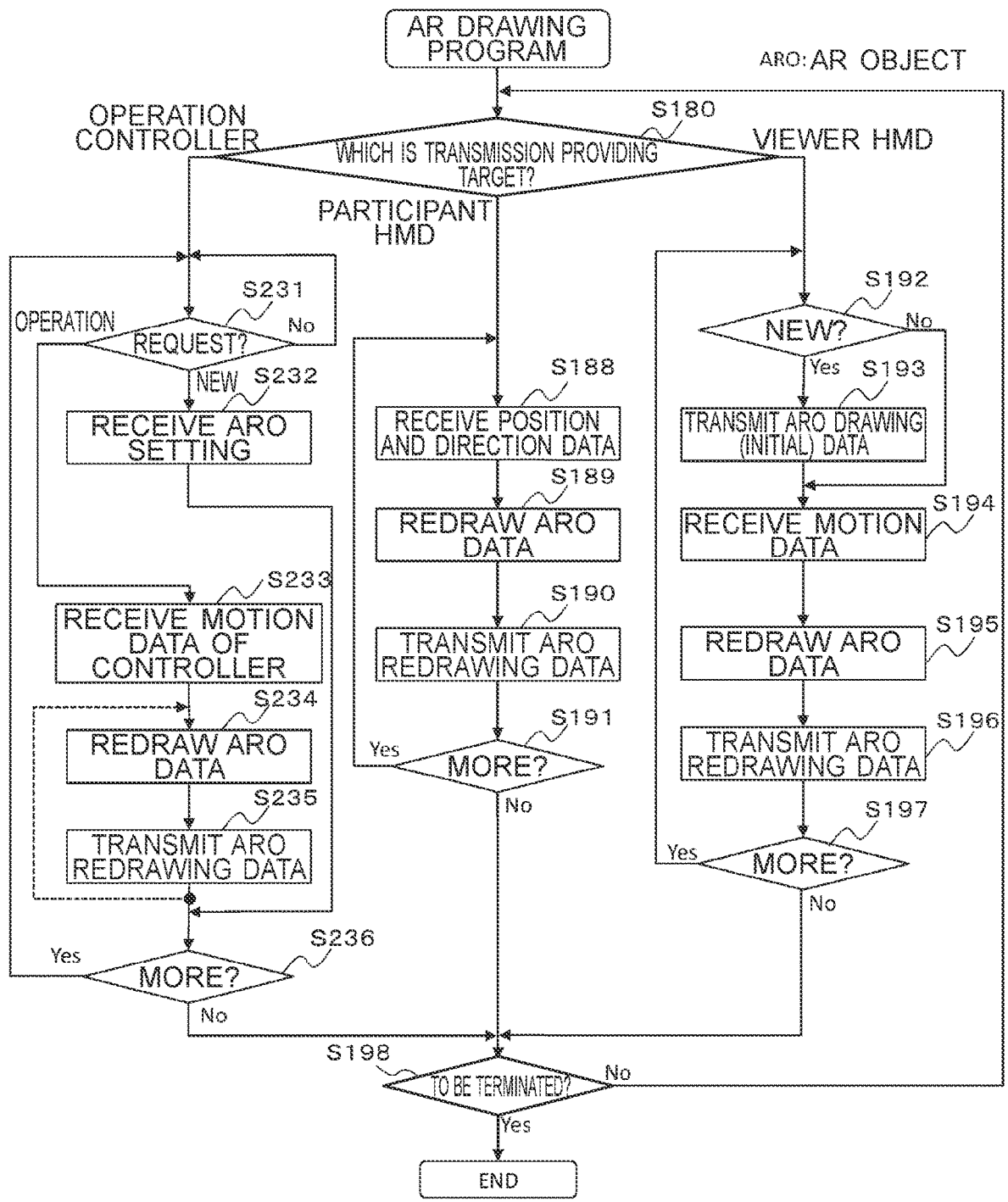
FIG. 23 illustrates a flowchart of an AR drawing program according to the fourth embodiment.

FIG. 23 is a flowchart of the AR drawing program 95.

The AR server 9 executes the processes of step S231 to step S236 to be provided to the experiencer HMD 1, the processes of step S188 to step S191 to be provided to the participant HMDs 2a to 2f illustrated in FIG. 16, and the processes of step S192 to step S197 to be provided to the viewer HMDs 3b, 3c and the information terminal 3a illustrated in FIG. 16.

The AR server 9 determines whether a request has been transmitted from any of the operation controllers 15a to 15f held by the experiencer HMD 1 (transmission requesting terminal), and determines the type thereof. In absence of transmission of a request (step S231: No), the AR server 9 stands by until a request is transmitted.

Upon receiving a setting request (step S231: setting), the AR server 9 receives setting data of at least one of the AR objects 4c to 4e from the transmission requesting terminal (step S232), and sets one of the AR objects 4c to 4e, which is generated by one of the operation controllers 15a to 15f held by a person wearing the experiencer HMD 1, and the parameters. Moving the operation controllers 15a to 15f in an "AR object setting" mode in accordance with a predetermined pattern causes the AR objects 4c to 4e to be automatically generated.

Upon receiving an operation request (step S231: operation), the AR server 9 receives the motion data of the operation controllers 15a to 15f (step S233), draws one of the AR objects 4c to 4e in accordance with the motion data (step S234), and transmits the data of one of the AR objects 4c to 4e which has been drawn (step S235).

The AR server 9 determines whether a subsequent request has been transmitted, and determines whether to continue the processing (step S236: Yes) or to proceed the processing to the termination determination in step S198 (step S236: No). The loop of step S234 and step S235 indicated by the dashed line indicates repetition of drawing and transmission of the AR objects 4c to 4e. The AR objects 4c to 4e generated by operations of the operation controllers have parameters for self-propelling. Each of the AR objects 4c to 4e generated as an attacking object self-propels toward an opponent experiencer in accordance with a predetermined speed pattern. The AR objects 4c to 4e automatically disappear when they hit an experiencer or go out of a predetermined area or the MR space 6.

In step S198, the AR server 9 determines whether to terminate the processing, and upon receiving a termination instruction, the AR server 9 terminates the processing (step S199: Yes) while in absence of a termination instruction (step S199: No), the AR server 9 returns the processing to step S231, step S188, and step S192 and continues the processing.

As described above, according to the fourth embodiment, the same advantageous effects as those of the first to third embodiments can be obtained, and moreover, a virtual reality sharing system including a plurality of experiencers can also be shared.

It should be noted that the invention is not limited to the embodiments described with reference to FIG. 1 to FIG. 23. For example, in the embodiments described above, although the VR video is generated by combining the camera-captured videos by a plurality of virtual reality sharing terminals that is present in the MR space 6, however, the VR video may be generated by combining camera-captured videos captured at different times from different positions and viewpoints by one virtual reality sharing terminal.

Furthermore, all the plurality of virtual reality sharing terminals that is present in the MR space 6 may be experiencer HMDs.

Furthermore, creating a VR video and then storing it in the VR server 8 enables the viewers 13a to 13c to, not only share the virtual reality with the experiencer 11 and participants 12a to 12e in real time, but also read the VR video that has been already created later to share the virtual reality.

It should be noted that the present invention allows a part of the configuration of one embodiment to be replaced with a part of other embodiments. Furthermore, configurations of other embodiments may be added to configurations of a certain embodiment. All of these are included in the scope of the present invention. The numerical values and messages appearing in the text and drawings are merely examples, and thus the advantageous effects of the present invention are not impaired even if different ones are used.

It should be also noted that some or all of the functions and the like of the invention may be implemented by hardware, for example, by designing them by an integrated circuit. Furthermore, a microprocessor unit, a CPU, or the like may interpret and execute an operation program, thereby causing them to be implemented by software. Still further, the implementation range of the software is not limited, and hardware and software may be used in combination.

REFERENCE SIGNS LIST

1: experiencer HMD
2a-2f: participant HMD
3a: viewer information terminal
3b, 3c: viewer HMD
4a: real object
4b-4d: AR object
5a-5e: access point
6: MR space
7: network
8: VR server
9: AR server
10a-10r: network signal
11, 11a-11f: experiencer
12a-12i: participant
13a-13c: viewer
14, 14a-14c: fixed camera
15a-15f: operation controller
21: camera
22: projector
22a: left projector
22b: right projector
23: screen
24: nose pad
25: processor
26: speaker
27: microphone
28: frame housing
28c: bridge
29: ranging camera
30: display
82: CPU
83: RAM
84: storage
85: VR creation program
86: VR data
87: internal bus
91: network IF
92: CPU
93: RAM
94: storage
95: AR drawing program
96: AR data
97: internal bus
100, 100a-100c: virtual reality sharing system
231: shutter
232: half mirror
250: orientation sensor
251: gyro sensor
252: acceleration sensor
253: wireless communication interface
254: CPU
255: RAM
256: video RAM
258, 265: basic program
259: MR experience program
260: feature extraction processor
261: distance calculation processor
262: internal bus
263, 263a: MR participation program
266: MR viewing program
301, 302: three-dimensional arrow
P1: area
P2: video

The invention claimed is:

1. A virtual reality sharing method, comprising the steps of:
acquiring a first camera-captured video generated by capturing a video of a real space at a first viewpoint of a first virtual reality sharing terminal;
as a first displaying step, causing the first virtual reality sharing terminal to display an augmented reality (AR) object to be superimposed on the real space;
acquiring a second camera-captured video generated by capturing a video of the real space at a second viewpoint different from the first viewpoint;
as a virtual reality (VR) video creating step, generating a virtual reality (VR) video by compositing the first camera-captured video and the second camera-captured video;
as a viewpoint acquiring step, acquiring setting input information about a viewer's viewpoint for taking in the virtual reality (VR) video, the setting input information having been accepted at a second virtual reality sharing terminal; and
as a second displaying step, superimposing the augmented reality (AR) object viewed from the viewer's viewpoint on the virtual reality (VR) video viewed from the viewer's viewpoint and causing the second virtual reality sharing terminal to display the virtual reality (VR) video,
wherein the first camera-captured video includes meta data indicating a relative position of a real object viewed from the first viewpoint, the real object being a display trigger of the AR object,
wherein the second camera-captured video includes meta data indicating a relative position of the real object viewed from the second viewpoint,
wherein in the VR video creating step, the VR video in which the relative position viewed from the first viewpoint and the relative position viewed from the second viewpoint are added is created, and
wherein in the second displaying step, based on the viewer's viewpoint, a position of the real object captured in the VR video is compared with a position of the AR object viewed from the viewer's viewpoint, and when the position of the real object is closer than that of the AR object, the VR video in which the real object hides at least a portion of the AR object is displayed, and when the position of the real object is farther than that of the AR object, the VR video in which the AR object hides at least a portion of the real object is displayed.

2. The virtual reality sharing method according to claim 1, wherein in the viewpoint acquiring step, the second virtual reality sharing terminal is caused to display a pointer indicating a viewpoint position and line-of-sight direction of the viewer's viewpoint to accept an input operation using the pointer.

3. The virtual reality sharing method according to claim 2, wherein in the viewpoint acquiring step, the second virtual reality sharing terminal is caused to display the pointer in a display area of the second virtual reality sharing terminal while the second virtual reality sharing terminal is being executed in a viewpoint setting mode, and upon termination of the viewpoint setting mode, the second displaying step is entered, and
wherein in the second displaying step, the pointer is caused not to be displayed in the display area, and also the display area is switched to display the VR video viewed from the viewer's viewpoint.

4. A virtual reality sharing system configured such that a virtual reality (VR) server that composites a plurality of camera-captured videos obtained by capturing videos of a same real space from different viewpoints to create a VR video, an augmented reality (AR) server that draws and creates an AR object, and a viewer virtual reality sharing terminal that receives the VR video and the AR object, superimposes the AR object on the VR video, and then displays the VR video are connected so as to be able to communicate with each other via a network, the viewer virtual reality sharing terminalcomprising,
a display, an input interface, a communication interface, and a processor, the processor being configured to:
when the input interface accepts a setting input operation about a viewer's viewpoint for taking in the VR video, transmit, from the communication interface, data indicating a position and direction of the viewer's viewpoint to the virtual reality (VR) server and the augmented reality (AR) server;
via the communication interface, receive the VR video viewed from the viewer's viewpoint from the virtual reality (VR) server, and also receive drawing data of the AR object viewed from the viewer's viewpoint from the augmented reality (AR) server; and
superimpose the AR object based on the drawing data on the VR video viewed from the viewer's viewpoint, and then display the VR video on the display,
wherein the plurality of camera-captured videos includes a first camera-captured video and a second camera-captured video,
wherein the first camera-captured video includes meta data indicating a relative position of a real object viewed from a first viewpoint, the real object being a display trigger of the AR object,
wherein the second camera-captured video includes meta data indicating a relative position of the real object viewed from a second viewpoint,
wherein the VR server creates the VR video in which the relative position viewed from the first viewpoint and the relative position viewed from the second viewpoint are added, and
wherein in the viewer virtual reality sharing terminal, the processor is configured to:
compare a position of the real object captured in the VR video viewed from the viewer's viewpoint with a position of the AR object viewed from the viewer's viewpoint;
when the position of the real object is closer than that of the AR object, display the VR video in which the real object hides at least a portion of the AR object; and
when the position of the real object is farther from the position of the AR object, display the VR video in which the AR object hides at least a portion of the real object.

5. The virtual reality sharing system according to claim 4, wherein the processor is configured to display a pointer indicating a viewpoint position and line-of-sight direction of the viewer's viewpoint on the display, and the input interface accepts an input operation using the pointer.

6. The virtual reality sharing system according to claim 5, wherein the processor is configured to:
execute either a viewpoint setting mode or a viewing; mode,
in the viewpoint setting mode, display the pointer on the display, and
in the viewing mode, not display the pointer in the display, superimpose the AR object on the VR video viewed from the viewer's viewpoint, and then display the VR video.

7. The virtual reality sharing system according to claim 4, wherein the VR server composites a first camera-captured video, which is generated by capturing a video of the real space from a first viewpoint by a first virtual reality sharing terminal, and a second camera-captured video, which is generated by capturing a video of the real space from a second viewpoint by a second virtual reality sharing terminal that is different from the first virtual reality sharing terminal at a same time when the first virtual reality sharing terminal captures the first camera-captured video, so as to create the VR video.

8. The virtual reality sharing system according to claim 4, wherein the VR server composites a first camera-captured video, which is generated by capturing a video of the real space from a first viewpoint by a first virtual reality sharing terminal, and a second camera-captured video, which is generated by capturing a video of the real space from a second viewpoint by the first virtual reality sharing terminal at a time different from that when the first virtual reality sharing terminal captures the first camera-captured video, so as to create the VR video.

* * * * *